US012533644B2

(12) United States Patent
Brockman et al.

(10) Patent No.: US 12,533,644 B2
(45) Date of Patent: Jan. 27, 2026

(54) MIXING DEVICE AND METHODS FOR MAKING BONE CEMENT

(71) Applicant: Stryker Corporation, Kalamazoo, MI (US)

(72) Inventors: Christopher Scott Brockman, Kalamazoo, MI (US); Gabriel James Harshman, Portage, MI (US); David Robert Boboltz, Kalamazoo, MI (US); Aurianna Salem Turvold, Kalamazoo, MI (US)

(73) Assignee: Stryker Corporation, Portage, MI (US)

( * ) Notice: Subject to any disclaimer, the term of this patent is extended or adjusted under 35 U.S.C. 154(b) by 946 days.

(21) Appl. No.: 17/613,690

(22) PCT Filed: Jun. 12, 2020

(86) PCT No.: PCT/US2020/037479
§ 371 (c)(1),
(2) Date: Nov. 23, 2021

(87) PCT Pub. No.: WO2020/252296
PCT Pub. Date: Dec. 17, 2020

(65) Prior Publication Data

US 2022/0234014 A1 Jul. 28, 2022

Related U.S. Application Data

(60) Provisional application No. 62/861,698, filed on Jun. 14, 2019.

(51) Int. Cl.
*B01F 35/75* (2022.01)
*B01F 27/072* (2022.01)
(Continued)

(52) U.S. Cl.
CPC ........ *B01F 27/0725* (2022.01); *B01F 27/091* (2022.01); *B01F 27/13* (2022.01);
(Continued)

(58) Field of Classification Search
CPC ......................... B01F 33/70; B01F 35/754251
(Continued)

(56) References Cited

U.S. PATENT DOCUMENTS 4,498,904 A 2/1985 Turner et al.
4,808,184 A * 2/1989 Tepic ...................... B01F 27/80 366/139
(Continued)

FOREIGN PATENT DOCUMENTS

CN 106560232 A 4/2017
CN 108065999 A 5/2018
(Continued)

OTHER PUBLICATIONS

English language abstract for CN 106560232 A extracted from espacenet.com database on Mar. 1, 2024, 2 pages.
(Continued)

*Primary Examiner* — David L Sorkin
(74) *Attorney, Agent, or Firm* — Howard & Howard Attorneys PLLC

(57) ABSTRACT

A mixing device and methods for making bone cement. A piston (156) of the mixing device is located in a first region (158) of a chamber (112) such that a mixing paddle (154) rotates to mix bone cement components at a first pressure to make a bone cement mixture. The piston (156) is moved passed an inlet opening (136) to be located within a second region (160) of the chamber (112) to compress the bone cement mixture to a second pressure greater than the first pressure to compress the bone cement mixture and make the bone cement. The bone cement may be transferred to a
(Continued)

delivery device. The mixing device may include features that automatically initiate the compression and transferring phases after completion of the mixing phase, and further include features that automatically terminate the operational cycle. A three-step intuitive workflow utilizing the mixing device to improve efficiency in the surgical suite is also disclosed.

10 Claims, 27 Drawing Sheets

(51) Int. Cl.

| | |
|---|---|
| ***B01F 27/091*** | (2022.01) |
| ***B01F 27/13*** | (2022.01) |
| ***B01F 27/231*** | (2022.01) |
| ***B01F 33/501*** | (2022.01) |
| ***B01F 33/70*** | (2022.01) |
| ***B01F 35/00*** | (2022.01) |
| ***B01F 35/32*** | (2022.01) |
| *B01F 101/20* | (2022.01) |

(52) U.S. Cl.
CPC ...... *B01F 27/2312* (2022.01); *B01F 33/5014* (2022.01); *B01F 35/32025* (2022.01); *B01F 35/562* (2022.01); *B01F 35/752* (2022.01); *B01F 35/754251* (2022.01); *B01F 2101/20* (2022.01)

(58) Field of Classification Search
USPC .................................................. 366/139, 190
See application file for complete search history.

(56) References Cited

U.S. PATENT DOCUMENTS

| | | | | |
|---|---|---|---|---|
| 5,145,250 | A * | 9/1992 | Planck | B01F 27/806 366/173.1 |
| 5,549,227 | A * | 8/1996 | Klotz | B65B 39/007 141/331 |
| 5,603,701 | A | 2/1997 | Fischer | |
| 5,797,680 | A | 8/1998 | Murray | |
| 6,176,607 | B1 | 1/2001 | Hajianpour | |
| 6,293,693 | B1 * | 9/2001 | Rodgers | B01F 23/47 366/195 |
| 6,547,432 | B2 | 4/2003 | Coffeen et al. | |
| 7,073,936 | B1 * | 7/2006 | Jonsson | B01F 35/718 366/139 |
| 7,270,667 | B2 | 9/2007 | Faccioli et al. | |
| 7,371,241 | B2 | 5/2008 | Evans et al. | |
| 7,837,378 | B2 * | 11/2010 | Khoshnevis | E04G 11/34 366/139 |
| 7,968,616 | B2 | 6/2011 | Meyer et al. | |
| 8,038,682 | B2 | 10/2011 | McGill et al. | |
| 8,415,047 | B2 | 4/2013 | Park et al. | |
| 8,506,572 | B2 | 8/2013 | Evans et al. | |
| 8,568,420 | B2 | 10/2013 | O'Halloran et al. | |
| 8,603,096 | B2 | 12/2013 | Agard et al. | |
| 8,809,418 | B2 | 8/2014 | Beyar et al. | |
| 9,750,840 | B2 | 9/2017 | Beyar et al. | |
| 10,307,195 | B2 | 6/2019 | Vogt | |
| 10,905,485 | B2 | 2/2021 | Giffard et al. | |
| 11,154,343 | B2 | 10/2021 | Vogt et al. | |
| 2002/0156483 | A1 * | 10/2002 | Voellmicke | A61L 24/0089 606/93 |
| 2004/0267272 | A1 | 12/2004 | Henniges et al. | |
| 2005/0105384 | A1 | 5/2005 | Eder et al. | |
| 2009/0057168 | A1 | 3/2009 | Smit | |
| 2009/0257306 | A1 * | 10/2009 | Coffeen | B01F 35/562 366/195 |
| 2012/0195157 | A1 | 8/2012 | Mckay | |
| 2017/0265920 | A1 | 9/2017 | Faccioli et al. | |
| 2022/0032246 | A1 * | 2/2022 | Samid | B01F 31/40 |

FOREIGN PATENT DOCUMENTS

| | | | |
|---|---|---|---|
| CN | 109789382 | A | 5/2019 |
| JP | 2001511419 | A | 8/2001 |
| WO | 1996040424 | A1 | 12/1996 |
| WO | 2017203233 | A1 | 11/2017 |
| WO | 2019200091 | A1 | 10/2019 |

OTHER PUBLICATIONS

English language abstract for CN 108065999 A extracted from espacenet.com database on Mar. 1, 2024, 2 pages.
English language abstract for CN 109789382 A extracted from espacenet.com database on Mar. 1, 2024, 3 pages.
English language abstract for JP 2001-511419 A extracted from espacenet.com database on Feb. 19, 2024, 2 pages.
Partial International Search Report for Application No. PCT/US2020/037479 dated Oct. 19, 2020, 2 pages.
International Search Report for Application No. PCT/US2020/037479 dated Dec. 11, 2020, 3 pages.
International Search Report for Application No. PCT/US2020/037479 dated Feb. 26, 2021, 6 pages.
International Search Report for Application No. PCT/US2020/037479 dated Apr. 30, 2021, 3 pages.

* cited by examiner

MIXING DEVICE AND METHODS FOR MAKING BONE CEMENT

PRIORITY CLAIM

The subject patent application is a national entry of International Application No. PCT/US2020/037479, filed Jun. 12, 2020, which claims priority to and all the benefits of U.S. Provisional Application No. 62/861,698, filed Jun. 14, 2019, the entire contents of each are incorporated herein by reference.

BACKGROUND

A common source of back pain is a vertebral compression fracture in which a weakened or injured vertebral body loses height or collapses. The weakening of the vertebral body may be due to acute injury or, more often, degenerative changes such as osteoporosis. One treatment modality includes vertebral augmentation in which the height of the vertebral body is elevated or restored, and stabilized at the elevated or restored height with curable bone cement. The bone cement typically includes bone cement components (e.g., a powdered polymer and a liquid monomer), which are packaged separately and mixed immediately prior to or during the vertebral augmentation procedure. Efficient, uniform, safe, and reproducible mixing of the bone cement components is an area of particular interest in development to ensure the bone cement has the expected mechanical properties and characteristics. Known devices requiring manual mixing (e.g., "open bowl" or vacuum techniques) are inefficient by requiring operating room staff intensely agitate the bone cement components. Different staff may mix the bone cement components with varying or differing intensities and/or for varying or differing durations that may result in the bone cement not being particularly uniform or reproducible. Further, certain manual mixing devices may undesirable expose the staff to the bone cement components. Known motorized mixing devices may overcome some of the aforementioned issues, but require the staff to engage a workflow that is overly complex, especially if the staff is unfamiliar with the device. Therefore, there is a need in the art for an improved mixing device and methods for making bone cement that overcome one or more of the aforementioned shortcomings.

SUMMARY

A first aspect of the present disclosure is directed to a mixing device for making bone cement from bone cement components. A chamber defines an inlet opening and has first and second ends and a longitudinal axis extending between the first and second ends. A first region of the chamber is defined longitudinally between the first end of the chamber and an end of the inlet opening nearest to the second end of the chamber. A second region of the chamber is defined longitudinally between the first region and the second end of the chamber. The mixing device includes a piston disposed in the chamber. The piston includes a face. The mixing device includes a mixing paddle rotatable within the chamber. The face of the piston is configured to be located within the first region of the chamber such that the chamber is at or below atmospheric pressure as the mixing paddle rotates to mix the bone cement components to make a bone cement mixture. The piston is movable along the longitudinal axis to position the face within the second region of the chamber to provide a fluid-tight closure between the piston and the chamber such that further movement of the piston within the second region compresses the bone cement mixture within the chamber.

In some implementations, a motor is operably coupled to the piston and the mixing paddle and configured to effectuate at least one of movement of the piston and rotation of the mixing paddle. The housing further may define an outlet port adjacent the second end of the chamber. A first switch may be coupled to the housing and connected to the motor. The first switch may be movable to an activated state in which the first switch activates the motor while the piston is within the first region. The first switch may be a momentary switch biased toward the deactivated state. A second switch may be coupled to the housing and connected to the motor. The second switch may be movable to a deactivated state in which the second switch deactivates the motor while the piston is within the second region. The second switch may be a non-momentary switch initially in the activated state. The first and second switches may be wired in series with the motor.

In some implementations, an actuator is coupled to the housing and movable to engage the switch and maintain the switch in the activated state against the bias while the piston moves from the first region to the second region. A transfer gear may be coupled to the motor and rotatable during the operational cycle. A stop nut may be configured to translate along the transfer gear and engage the actuator while the piston is within the second region.

A second aspect of the disclosure involves a method of making bone cement with the mixing device according to the first aspect of the disclosure, and optionally, any of its corresponding implementations.

A third aspect of the present disclosure is directed to a mixing device for making bone cement from bone cement components. The mixing device includes a housing, and a chamber within the housing. The chamber has a first region, and a second region separate from the first region. The mixing device includes a mixing paddle rotatable within the chamber to mix bone cement components to make a bone cement mixture. A piston is movable within the chamber to compress the bone cement components. A motor is coupled to the piston and the mixing paddle. A first switch is connected to the motor. The first switch being momentary and biased to a deactivated state in which the first switch prevents activation of the motor. The first switch is configured to move from the deactivated state to an activated in which the switch initiates an operational cycle by activating the motor to effectuate at least one of movement of the piston and rotation of the mixing paddle. A second switch is wired in series with the first switch and the motor. The second switch is non-momentary and initially disposed an activated state to permit activation of the motor. The second switch is configured to be moved from the activated state to a deactivated state in which the motor is deactivated to terminate the operational cycle. The piston is configured to move within the chamber from a first region to a second region to mix and compresses the bone cement mixture within the chamber. The piston is within the first region during actuation of the first switch, and within the second region during actuation of the second switch.

In some implementations, the chamber is at or below atmospheric pressure with the piston in the first region, and the chamber is above atmospheric pressure with the piston in the second region. An actuator may be coupled to the housing and movable between a first position in which the actuator is spaced apart from the first switch, and a second position in which the actuator engages the first switch to actuate the first switch.

A fourth aspect of the disclosure involves a method of making bone cement with the mixing device according to the third aspect of the disclosure, and optionally, any of its corresponding implementations.

A fifth aspect of the present disclosure is directed to a mixing device for making bone cement from bone cement components. The mixing device includes a housing, and a chamber within the housing. The chamber defines an inlet opening configured to receive bone cement components. A mixing paddle is rotatable within the chamber to mix the bone cement components to make a bone cement mixture. A piston is movable within the chamber to compress the bone cement components. A motor is coupled to the piston and the mixing paddle. A first switch is mounted to the housing connected to the motor, the first switch initially in a deactivated state. A second switch is mounted to the housing and spaced from the first switch. The second switch is in an activated state. The first and second switches wired in series with the motor. An actuator is coupled to the housing and movable between a first position in which the actuator is spaced apart from the first switch and the inlet opening is open to the ambient environment, and a second position in which the actuator engages the first switch to move the first switch from the deactivated state to the activated state. A stop nut is movable to be engaged with the second switch to move the second switch from the activated state to the deactivate state.

In some implementations, the actuator is a slider comprising a slider body, an arm extending from an underside of the slider body. The arm is configured to be deflected laterally and into engagement with the first switch. The first and second switches may be directly mounted to the housing at separate locations without being coupled to a printed circuit board.

A sixth aspect of the disclosure involves a method of making bone cement with the mixing device according to the fifth aspect of the disclosure, and optionally, any of its corresponding implementations.

A seventh aspect of the present disclosure is directed to a mixing device for making bone cement. The mixing device includes a housing, and a chamber within the housing. The chamber defines an inlet opening configured to receive bone cement components. The mixing device includes a mixing paddle rotatable within the chamber to mix the bone cement components to make a bone cement mixture. A piston is movable within the chamber to compress the bone cement components. A motor is coupled to the piston and the mixing paddle. A switch is connected to the motor. An actuator is coupled to the housing and movable between a first position and a second position. In the first position, the actuator is spaced apart from the switch and the inlet opening is open to the ambient environment. In the second position, the actuator engages the switch to simultaneously (i) move the switch from a deactivated state to an activated state in which the switch initiates an operational cycle by activating the motor to effectuate at least one of movement of the piston and rotation of the mixing paddle, and (ii) close the inlet opening.

In some implementations, the housing defines an aperture. The actuator may include a door arranged to be positioned between the inlet opening and the aperture when the actuator is in the second position. The inlet opening is positioned beneath the aperture such that the bone cement components being directed through the aperture further pass through the inlet opening and into the chamber under the influence of gravity. A funneling device may include a widened portion, and a stem sized to be received within the aperture of the housing. A flexible tether may couple the funneling device with the housing. The funneling device may include a detent on the stem. The detent is configured to releasably engage a complementary locking feature of the housing.

In some implementations, the actuator of the ninth aspect may be included on the mixing device of any one of first, third, fifth, and seventh aspects, and optionally, any of their corresponding implementations.

An eighth aspect of the disclosure involves a method of making bone cement with the mixing device according to the seventh aspect of the disclosure, and optionally, any of its corresponding implementations.

A ninth aspect is directed to a mixing device for making bone cement. The mixing device includes a housing having an upper shell, and a lower shell coupled to the upper shell. A chamber is within the housing. The chamber defines an inlet opening configured to receive bone cement components. A mixing paddle is rotatable within the chamber to mix the bone cement components to make a bone cement mixture. A piston is within the chamber to compress the bone cement components. A motor is coupled to the piston and the mixing paddle. The upper shell comprises a funnel having a sloped surface defining an aperture in communication with the inlet opening.

In some implementations the upper shell has an upper surface with the sloped surface extending downwardly away from the upper surface. The funnel may be frustoconical in shape.

In some implementations, the integrated funnel of the ninth aspect may be included on the mixing device of any one of first, third, fifth, and seventh aspects, and optionally, any of their corresponding implementations.

A tenth aspect of the disclosure involves a method of making bone cement with the mixing device according to the ninth aspect of the disclosure, and optionally, any of its corresponding implementations.

An eleventh aspect is directed to a mixing device for making bone cement. The mixing device includes a housing, and a chamber within the housing and defining an inlet opening configured to receive bone cement components. A mixing paddle is rotatable within the chamber to mix the bone cement components to make a bone cement mixture. A piston is movable within the chamber to compress the bone cement components. A motor is coupled to the piston and the mixing paddle. A display is coupled to the housing and configured to display information indicative of the operation of the mixing device.

In some implementations, the display is a liquid crystal display (LCD), a series of lights, a digital timer, or an analog timer. The information may be one of remaining time for operation of the mixing device, elapsed time of working with the bone cement, and estimated remaining time of working with the bone cement.

In some implementations, the display of the eleventh aspect may be included on the mixing device of any one of first, third, fifth, seventh, and ninth aspects, and optionally, any of their corresponding implementations.

A twelfth aspect of the disclosure involves a method of making bone cement with the mixing device according to the ninth aspect of the disclosure, and optionally, any of its corresponding implementations.

A thirteenth aspect of the present disclosure is directed to a mixing device for making bone cement. The mixing device includes a housing, and a chamber within the housing. The chamber has a first region, and a second region separate from the first region. The mixing device includes a mixing paddle rotatable within the chamber to mix bone cement components to make a bone cement mixture. A piston is movable within the chamber to compress the bone cement components. A motor is coupled to the piston and the mixing paddle. A switch is connected to the motor. The switch is configured to move between an activated state in which the switch initiates an operational cycle by activating the motor to effectuate at least one of movement of the piston and rotation of the mixing paddle, and a deactivated state in which the switch terminates the operational cycle by deactivating the motor. The switch is biased toward the deactivated state. An actuator is coupled to the housing and movable between a first position in which the actuator is spaced apart from the switch, and a second position in which the actuator engages the switch to move the switch from the deactivated state to the activated state and maintains the switch in the activated state against the bias. The piston is configured to move within the chamber from the first region to the second region such that, when the piston is within the second region, the actuator is mechanically disengaged from the switch to permit the biased return of the switch from the activated state to the deactivated state.

In some implementations, the switch is a momentary switch. A transfer gear may be coupled to the motor and rotatable during the operational cycle. A stop nut may be coupled to the transfer gear rotationally constrained relative to the transfer gear such that the stop nut is configured to translate along the transfer gear and engage the actuator to effectuate the mechanical disengagement of the actuator from the switch. The stop nut may include a nut portion having an inner diameter threadably engaging an outer diameter of the transfer gear, and a flange portion extending from the nut portion with the flange portion configured to engage the actuator to effectuate the mechanical disengagement of the actuator from the switch.

In some implementations, the actuator is a slider having a slider body, an arm extending from an underside of the slider body, and a stop feature coupled to the arm and configured to engage the switch. The slider may further include a ramping surface coupled to the arm and arranged to be engaged by the stop nut as the stop nut translates with rotation of the transfer gear, wherein the engagement of the stop nut with the ramping surface imparts flexion to the arm and disengage the stop feature from the switch.

A fourteenth aspect of the disclosure involves a method of making bone cement with the mixing device according to the third aspect of the disclosure, and optionally, any of its corresponding implementations.

A fifteenth aspect of the present disclosure is directed to a kit for performing a vertebral augmentation procedure with bone cement. The kit includes a mixing device for mixing bone cement components to make a bone cement mixture and compressing the bone cement mixture. The mixing device includes a chamber, a piston movable within the chamber, and a mixing paddle movable within the chamber. The chamber defines an inlet opening, and an outlet port in communication with the inlet opening. The kit includes a delivery device comprising a chamber defining an inlet port for receiving the bone cement from the mixing device. The kit further includes packaging sized to accommodate the mixing device and the delivery device. The inlet port of the delivery device is in communication with the outlet port of the mixing device such that the mixing device and the delivery device are removably coupled to one another within the packaging. The mixing device and the delivery device are configured to be removed from the packaging as a single unit.

In some implementations, a longitudinal axis of the chamber of the mixing device and a longitudinal axis of a chamber of the delivery device are parallel when the mixing device and the delivery device are removably coupled to one another such that the mixing device and the delivery device are disposed within the packaging in a side-by-side arrangement. The outlet port of the mixing device and the inlet port of the delivery device may be arranged perpendicular to each of the respective longitudinal axes to facilitate the side-by-side arrangement.

In some implementations, the kit includes a funneling device, and a flexible tether coupling the funneling device and the mixing device. The funneling device is configured to be removed from the packaging as the single unit. Alternatively, the funneling device may be integrated into the housing. The kit may further include a liquid monomer and a powdered polymer disposed within the sterile packaging. The packaging may be a blister pack.

BRIEF DESCRIPTION OF THE DRAWINGS

The advantages of the present disclosure will be readily appreciated as the same becomes better understood by reference to the following detailed description when considered in connection with the accompanying drawings. It is to be understood that the drawings are purely illustrative and are not necessarily drawn to scale.

DETAILED DESCRIPTION

Figure 1:
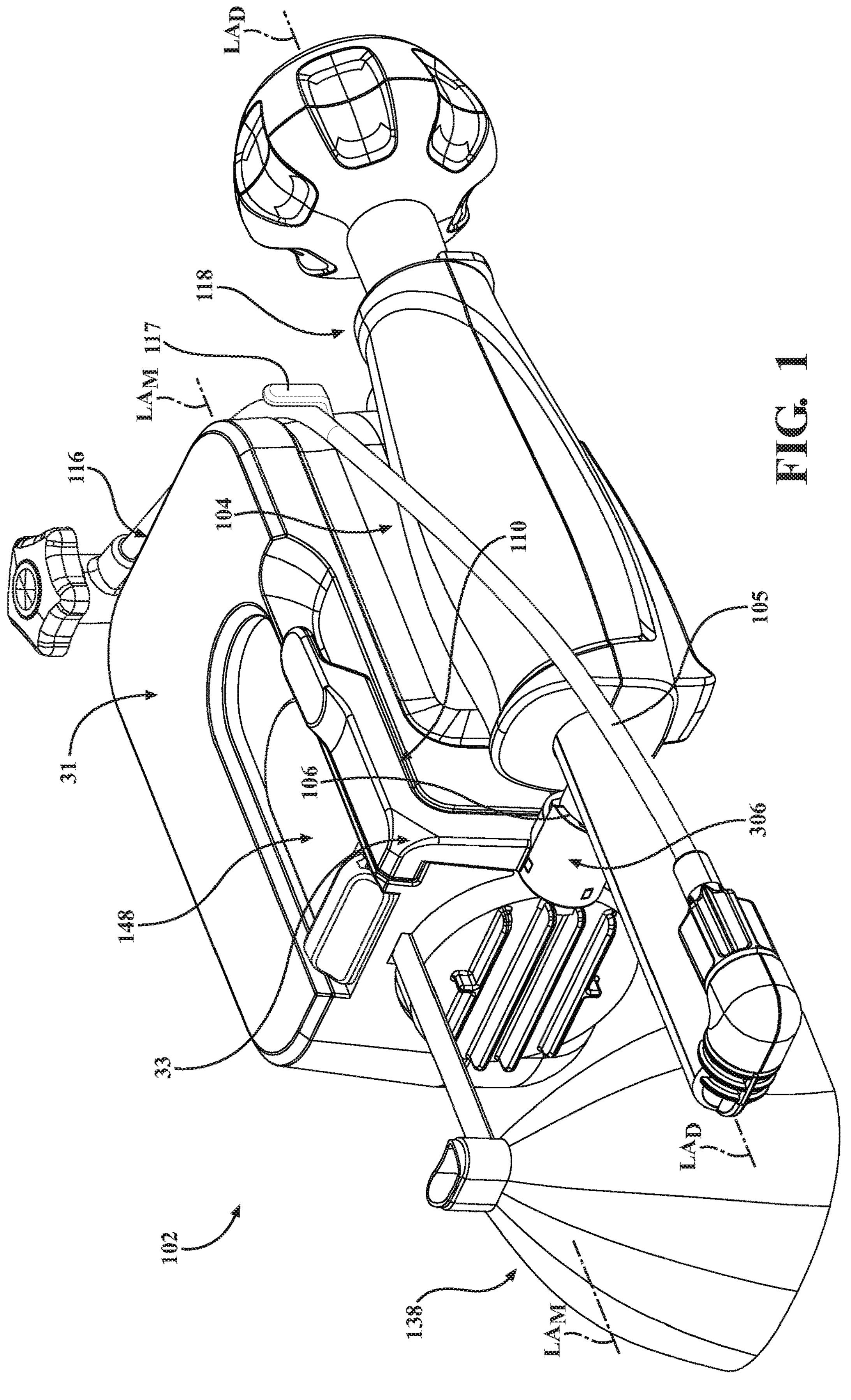
FIG. 1 is a rear perspective view of a mixing and delivery system including a mixing device and a delivery device.

Referring now to the figures, wherein like numerals indicate corresponding parts throughout the several views, a mixing and delivery system 100 is shown in FIG. 1. The system 100 includes a mixing device 102 for mixing a plurality of components to make a mixture, and a delivery device 104 for delivering the mixture to a target site. The system 100 is useful for any procedure where delivery of the mixture to the target site is indicated. In one example, the mixing device 102 mixes bone cement components to make a bone cement mixture, and the bone cement mixture is transferred to the delivery device 104. In particular, the mixing device 102, upon actuation, automatically performs an operational cycle including a mixing phase and a compression phase, and automatically transfers the bone cement to the delivery device 104 in an intuitive workflow to be described. The intuitive workflow promotes efficiency in the surgical suite as well as consistency of the bone cement mixture while reducing user exposure to the bone cement components. Once transferred to the delivery device 104, the delivery device 104 is operated by the user to deliver the bone cement, for example, within the vertebral body during a vertebroplasty or a kyphoplasty procedure. An example of the delivery device 104 suitable for the present system is disclosed in commonly owned International Publication No. WO2019/200091, published Oct. 17, 2019, the entire contents of which is hereby incorporated by reference. Another example of the delivery device 104 suitable for the present system is disclosed in commonly owned U.S. Pat. No. 6,547,432, issued Apr. 15, 2003, the entire contents of which is hereby incorporated by reference.

FIG. 1 shows the delivery device 104 removably coupled to the mixing device 102. The delivery device 104 includes an inlet port 106 configured to be removably positioned in sealed fluid communication with an outlet port 108 of the mixing device 102. A release assembly 110 to be described in greater detail facilitates the connection between the mixing device 102 and the delivery device 104, thereby establishing the communication between the inlet and outlet ports 106, 108. The communication between the inlet and outlet ports 106, 108 further establishes fluid communication between a chamber 112 (see FIGS. 4 and 5) of the mixing device 102 and a chamber (not identified) internal to the delivery device 104 for transferring of the bone cement mixture.

Figure 2:
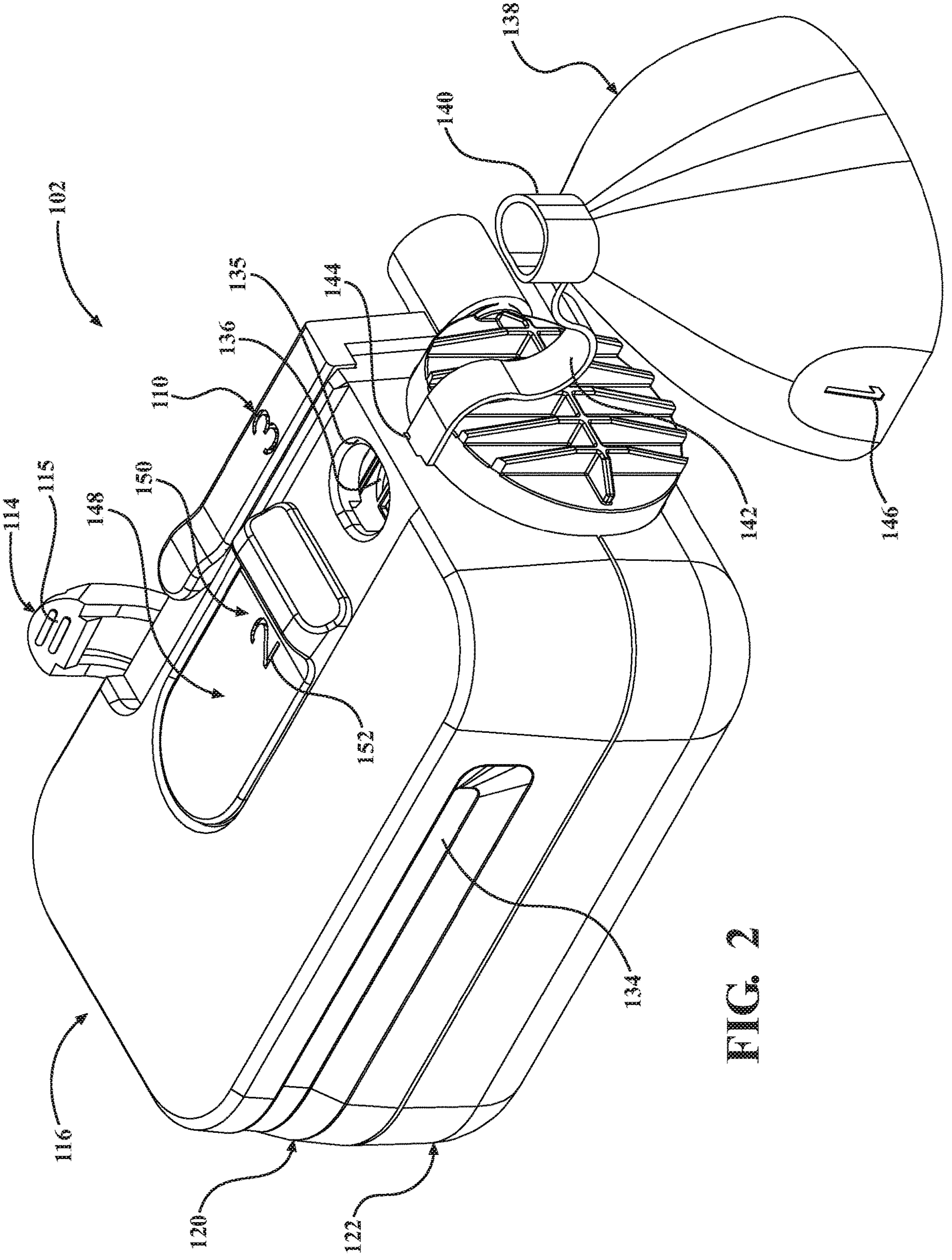
FIG. 2 is a front perspective view of the mixing device.
Figure 3:
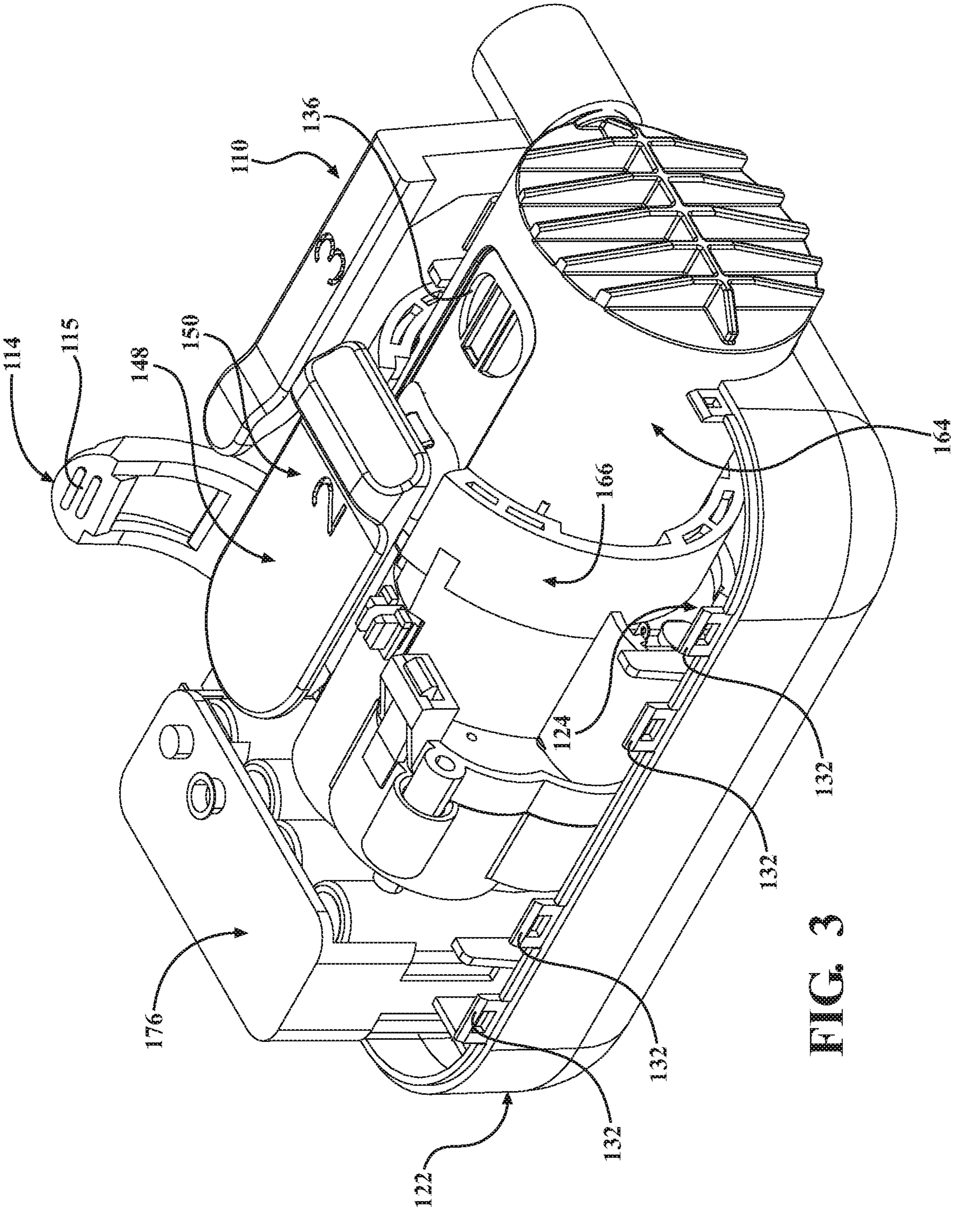
FIG. 3 is a front perspective view of the mixing device with an upper shell of the housing removed.

The mixing device 102 includes a housing 116. FIG. 1 and FIGS. 2 and 3 show implementations of the housing 116 in which like numbers are like components, but with differences in features and design. The housing 116 of FIG. 1, for example, includes a cradle 114 and/or a hook 117 coupled to the housing 116 for supporting the delivery device 104. The cradle 114 is sized and shaped to facilitate ease with decoupling the housing 118 of the delivery device 104 from the mixing device 102, and the hook 117 may be sized and shaped to facilitate ease with transporting and decoupling an extension tube 105 of the delivery device 104. FIG. 1 shows the cradle 114 as an arcuate projection generally sized to a portion of the housing 118 of the delivery device 104. In such a coupled configuration, the cradle 114 cooperates with the release assembly 110 to permit the system 100 to be moved as a unit, for example, with one hand. In one configuration, the outlet port 108 being located on a side of the mixing device 102 permits the delivery device 104 and the mixing device 102 to be packaged in the coupled configuration before deployment in the surgical suite with advantages to be later explained in greater detail. However, other locations of the outlet port 108 are also contemplated.

The implementation of FIG. 2 shows the cradle 114 further including a control surface 115 configured to receive an input from a user to permit removal of the housing 118 of the delivery device 104 from the cradle 114. In particular, the cradle 114 may be formed from materials permitting the cradle 114 to flex upon the input from the user. Absent the user input, the cradle 114 may provide a retention force to the housing 118 of the delivery device 104. In another implementation, the retention force from a transfer conduit 306, 306' of the mixing device 102 and a release assembly 110 of the delivery device 104 (see FIGS. 17-20) is sufficient to maintain relative position of the mixing device 102 and the delivery device 104. The cradle 114 supports the delivery device 104, but otherwise provides no retention force.

Referring now to FIG. 2, the mixing device 102 includes the housing 116, which may be formed from suitable materials and manufacturing processes. The housing 116 may include an upper shell 120, and a lower shell 122 coupled to the upper shell 120. Cavities defined by each of the upper and lower shells 120, 122 are sized to accommodate most of the components of the mixing device 102. The upper and lower shells 120, 122 may be removably or permanently coupled to one another. With the mixing device 102 possibly being a disposable component after a single use, the need to access an interior 124 of the housing 116 may be infrequent. Yet in such instances, the housing 116 may include a decoupling feature 126 configured to receive an input from the user to decouple the upper shell 120 from the lower shell 122, thereby exposing the components housed within the interior 124 of the housing 116. FIG. 1 shows the decoupling feature 126 as a tab 128 adjacent a grip feature 130 at the interface between the upper and lower shells 120, 122. The input applied to the tab 128 while maintaining a position of the grip feature 130 overcomes the retention force provided by detents at the interface between the upper and lower shells 120, 122 (FIG. 3 identifies female portions 132 of the detents). Another grip feature 134 extending around at least a portion of the upper shell 120 may be provided to permit the housing 116, and the system 100 if desired, to be moved as a unit, for example, with one hand as mentioned.

Figure 4:
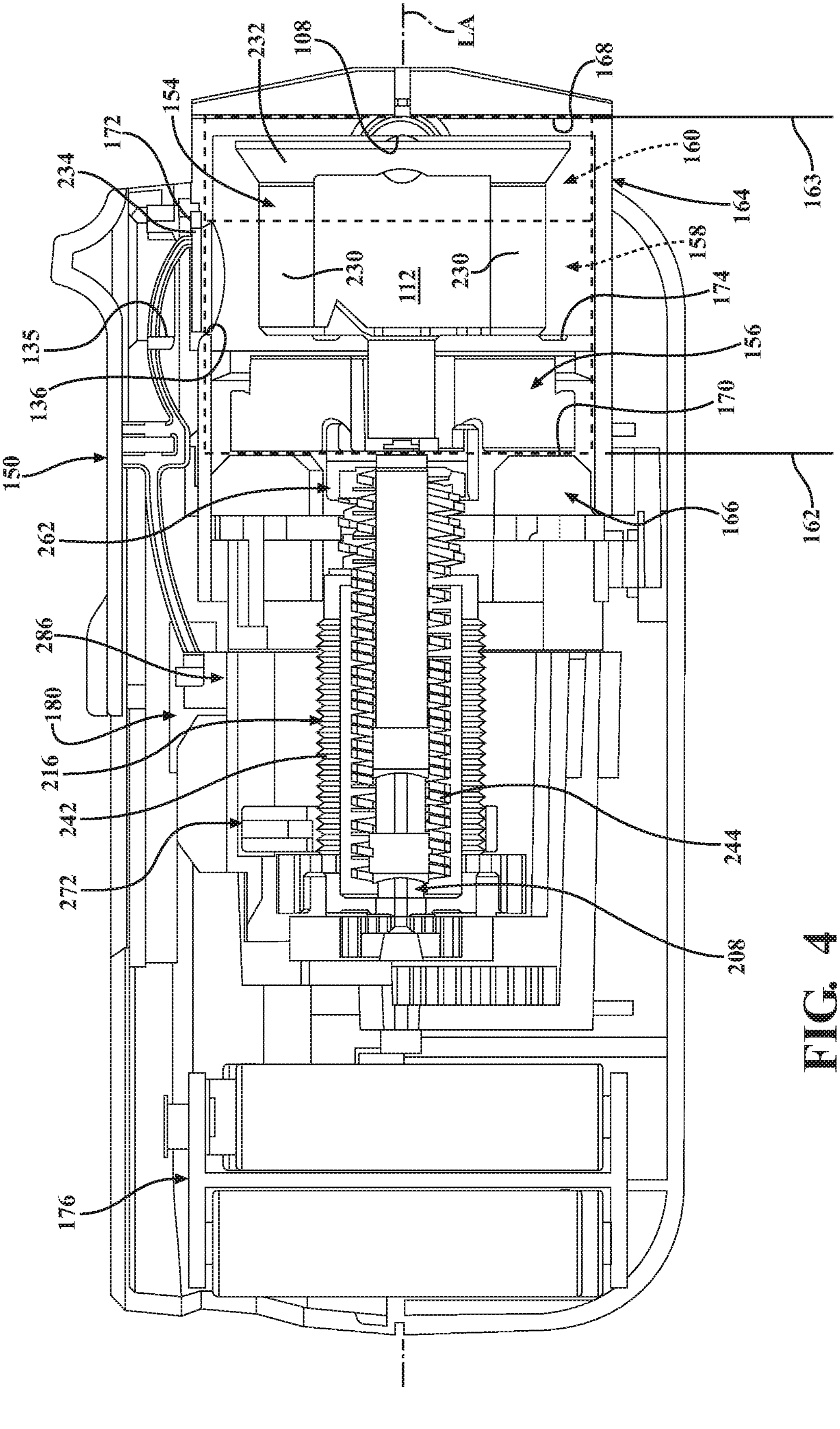
FIG. 4 is a sectional elevation view of the mixing device showing a piston positioned within a first region of a chamber of the mixing device.
Figure 5:
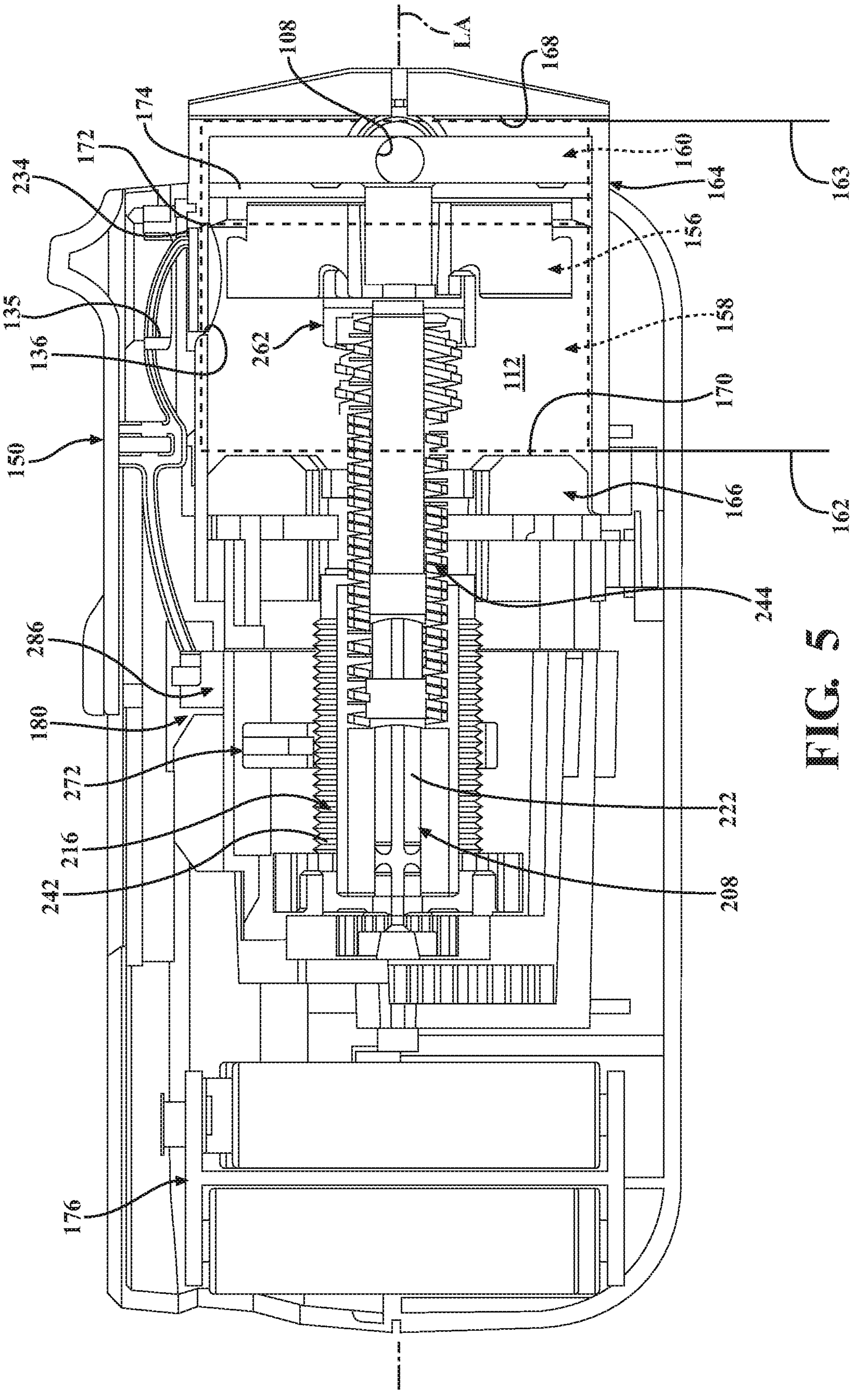
FIG. 5 is a sectional elevation view of the mixing device showing the piston positioned within a second region of the chamber of the mixing device.

With continued reference to FIG. 2, the housing 116 includes or defines an aperture 135. The aperture 135 extends through an upper wall of the upper shell 120 of the housing 116. The aperture 135, in the broadest sense, is the orifice through which the bone cement components are introduced to the chamber 112 prior to initiation of the operation cycle including the mixing, compression, and transferring phases. FIGS. 4 and 5 show the chamber 112, and more particularly a front chamber housing 164, including or defining an inlet opening 136 in communication with the aperture 135 and the chamber 112. The inlet opening 136 may be positioned directly beneath the aperture 135 such that the bone cement components directed through the aperture 135 further pass through the inlet opening 136 and into the chamber 112 under the influence of gravity. The chamber 112 is disposed within the housing 116.

To facilitate effective introduction of the bone cement components through the aperture 135, a funneling device 138 may be provided. The bone cement components typically include a liquid monomer and a powdered polymer. The funneling device 138 includes a widened opening opposite a narrowed opening defined by a stem 140 sized to be received within the aperture 135 of the housing 116. Further, the funneling device 138 may include a flexible tether 142 coupling the funneling device 138 to the housing 116. The flexible tether 142 may be retained through a slot in the upper shell 120 of the housing 116, but other suitable joining means are contemplated. Among other advantages, the flexible tether 142 allows the funneling device 138 to be packaged as coupled to the housing 116 and further permits the system 100 including the funneling device 138 to be moved as a unit, for example with one hand. Known systems including a funnel require the funnel to be handled separately and require additional transfers across the sterile barrier of the surgical suite. The flexible tether 142 is coupled to the housing 116 with the funneling device 138 inverted in an initial configuration, as shown in FIGS. 1 and 2. During a step of the intuitive workflow, the user manipulates the funneling device 138 to position the stem 140 within the aperture 135. This may be considered the first step of the workflow, as indicated by the indicia 144 on the funneling device 138 being the number "1." In some implementations, the funneling device 138 may include a detent (not shown) disposed on the stem 140. The detent is configured to releasably engage a complementary opening 143 defined within the housing 116 near the aperture 135. The engagement of the detent provides an audible and/or tactile feedback to the user that the funneling device 138 is properly installed to receive the bone cement components. Thereafter, the user introduces the bone cement components into the funneling device 138 to be directed to the chamber 112.

The user actuates an actuator 148, for example a slider 150 movably coupled to the housing 116 and to be further described, to initiate the operational cycle. The actuator 148 may include indicia 152, in this case the number "2," corresponding to the second step of the intuitive workflow.

The operational cycle includes the mixing phase in which a mixing paddle 154 disposed within the chamber 112 mixes the bone cement components, and the compression and transferring phases in which a piston 156 disposed within the chamber 112 compresses and transfers the bone cement through the outlet port 108 to the delivery device 104, respectively. Referring now to FIGS. 4 and 5, sectional elevation views of the mixing device 102 are shown with FIG. 4 depicting the mixing device 102 during the mixing phase and FIG. 5 depicting the mixing device 102 during the compression and transferring phase.

The mixing phase, in the broadest sense, occurs when the piston 156 is located in a first region 158 of the chamber 112 such that the bone cement components enclosed within the chamber 112 are at a first pressure, and transferring phase, in the broadest sense, occurs when the piston 156 is located in a second region 160 of the chamber 112 such that the bone cement components are compressed to a second pressure greater than the first pressure. In one example, the first pressure is at or below atmospheric pressure (e.g., at or near one atmosphere, substantially equal to ambient pressure, etc.), and the second pressure is greater than atmospheric pressure (e.g., four to seven atmospheres). The chamber 112 may be defined by or within the front chamber housing 164 (see FIG. 18) coupled to a rear chamber housing 166 (see FIG. 10). With concurrent reference to FIG. 3, the front chamber housing 164 may be cylindrical in shape and extend beyond the housing 116. The front chamber housing 164 may include an interior face 168 at least partially defining the chamber 112. The rear chamber housing 166 may be a cap-like feature complementary to the front chamber housing 164 and define a front face 170 at least partially defining the chamber 112 opposite the interior face 168 (see FIG. 10). For convention and as illustrated in FIGS. 4 and 5, the front face 170 of the rear chamber housing 166 may define a first end 162 of the chamber 112, and the interior face 168 of the front chamber housing 164 may define a second end 163 of the chamber 112.

The first and second regions 158, 160 are represented schematically in FIGS. 4 and 5. The first region 158 of the chamber 112 may be defined in elevation between the first end 162 of the chamber 112 an end 172 of the inlet opening 136 nearest the interior face 168. More particularly, the first region 158 may be defined between the first end 162 of the chamber 112 and a plane intersecting the end 172 of the inlet opening 136 and perpendicular to the longitudinal axis LA of the chamber 112. In other words and to be explained further, when a face 174 of the piston 156 moving along the longitudinal axis LA has not yet reached the end 172 of the inlet opening 136 defining the boundary between the first and second regions 158, 160, the face 174 is in the first region 158 and at least a portion of the inlet opening 136 is generally open to ambient and the chamber 112 is at least substantially at atmospheric pressure. The second region 160 may be defined between the end 172 of the inlet opening 136 and the interior face 168. In other words, when the face 174 of the piston 156 moving along the longitudinal axis LA is in the second region 160, the face 174 has passed the inlet opening 136, a fluid-tight closure may be formed between the piston 156 and the housing 116 to seal the chamber 112 from the ambient. Thus, in operation, with the face 174 of the piston 156 in the first region 158 of the chamber 112 extending longitudinally between the first housing end 162 and the opening end 172, the bone cement components are mixed at the first or atmospheric pressure with the mixing paddle 154 to make the bone cement mixture. Subsequently, the piston 156 is moved along the longitudinal axis LA to be located in the second region 160 extending longitudinally between the opening end 172 and the second housing end 163 to compress the bone cement mixture in the chamber 112 to the second pressure greater than the first or atmospheric pressure. The bone cement mixture may also be transferred to the delivery device 104 through the outlet port 108 in communication with the chamber 112. Among other advantages to be readily appreciated, the piston 156 passing the inlet opening 136 to seal the chamber 112 during compression and transfer of the bone cement to the delivery device 104 reduces or eliminates the need for many high-pressure components required of existing systems. For example, existing systems may require an attachable lid, and the lid and the manner by which the lid is joined to the device must be designed to withstand the heightened pressures associated with the compression phase. The lid and its interface are often prone to acute failure. The lid and its interface may not be intuitive to users and consequently are prone to installation errors and resultant failures. The lid must be transferred to the sterile field separately from the mixer, which increases the risk of contamination of sterile surfaces. The lid may also be dropped on the floor, or may roll off the table onto the floor, rendering the mixing unit unusable. The piston 156 passing the inlet opening 136 to seal the chamber 112 eliminates the need for an attachable lid. Consequently, the self-sealing nature of the chamber 112 of the mixing device 102 reduces or eliminates the likelihood of inadvertent user exposure to the bone cement mixture under heightened pressures.

The mixing device 102 may include a sealing element (not identified) coupled to the piston 156 to provide a fluid-tight closure between the piston 156 and the housing 116. Near the face 174 of the piston 156, the piston 156 may include a recess 175. The recess 175 may extend annularly around the piston 156, and the sealing element, for example an O-ring gasket, is at least partially seated within the recess 175. The sealing element interacts with the interior surface of the housing 116 to provide the fluid-tight closure between the piston 156 and the housing 116.

The electromechanical operation of the mixing device 102 to impart rotation of the mixing paddle 154 during the mixing phase will now be described with reference to FIGS. 4-9. The mixing device 102 may be electrically powered by a battery pack 176 including a plurality of batteries shown in FIGS. 4 and 5. In one example, the battery pack 176 includes eight conventional double-A batteries; however, alternatives are contemplated such as lithium ion and/or other disposable or rechargeable batteries. While less convenient for the surgical suite, the mixing device 102 may also be adapted to be powered in a corded arrangement. The mixing device 102 further includes a motor 178 in communication with the battery pack 176. Further, the mixing device 102 further includes a switch 180 in communication with the motor 178 and configured to be actuated between an activated state and a deactivated state. In one example, the switch 180 is a momentary microswitch internally biased to the deactivated state. This advantageously provides for returning the switch 180 to its original position to cease operation of the mixing device 102, as necessary. In another example, the switch 180 is a non-momentary switch, for example, a toggle switch. Upon actuation of the switch 180 in manners to be explained in greater detail, the motor 178 is operated to provide a rotational output to an output shaft 182 of the motor 178. It is contemplated that the motor 178 is optional, and the mixing device 102 may be a manual mixing device. In such an example, the piston may be akin to a plunger and mixing paddle on a shaft configured to receive an input from the user. The plunger may be within the first region 158 as the bone cement components are mixed with the mixing paddle 154 at atmospheric pressure, and the plunger may be moved, in response to an input from the user, to the second region 160 to compress the bone cement mixture in the chamber 112 to a pressure greater than atmospheric pressure. Alternatively, manual mixing may be performed with a mixing blade on a shaft configured to receive an axial and rotational input to the user, as disclosed in the aforementioned U.S. Pat. No. 6,547,432. Another non-motorized configuration may include a manually operated crank operating a geartrain that both rotates the mixing paddle 154 and advances the piston 156.

Figure 6:
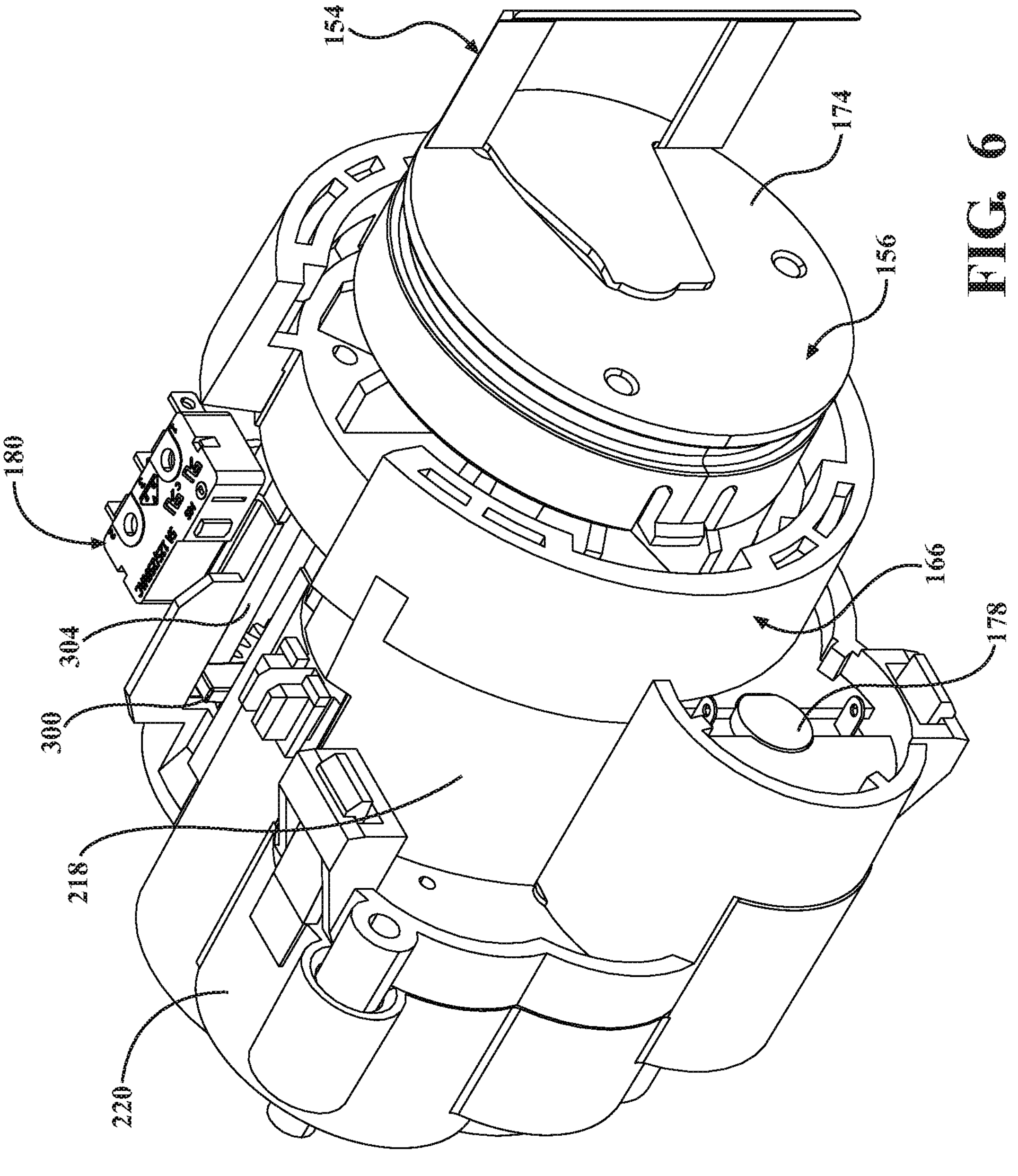
FIG. 6 is a perspective view of a subassembly of the mixing device including a switch, the piston, and a mixing paddle.
Figure 7:
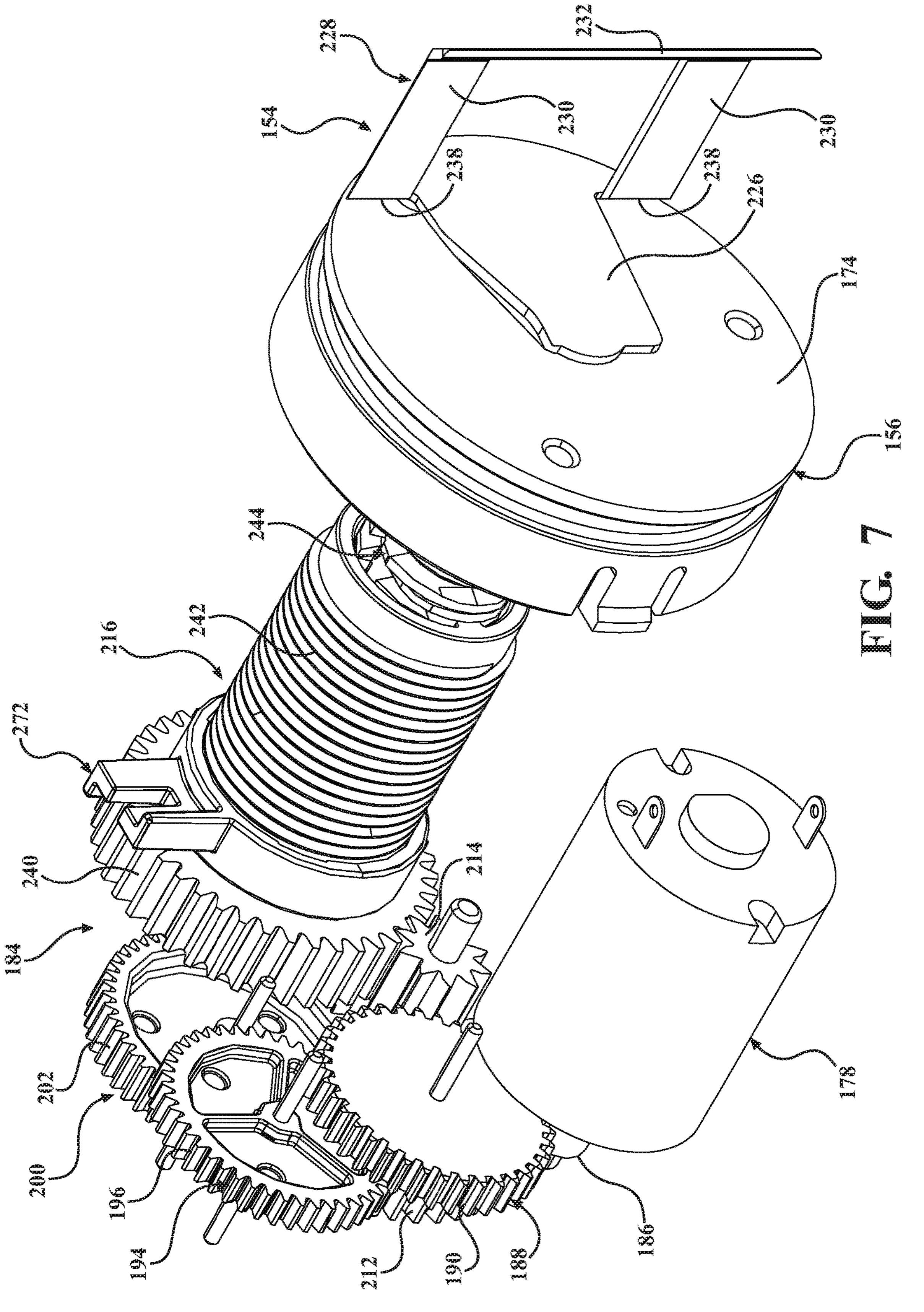
FIG. 7 is a perspective view of a geartrain of the mixing device coupled to the piston and the mixing paddle.
Figure 8:
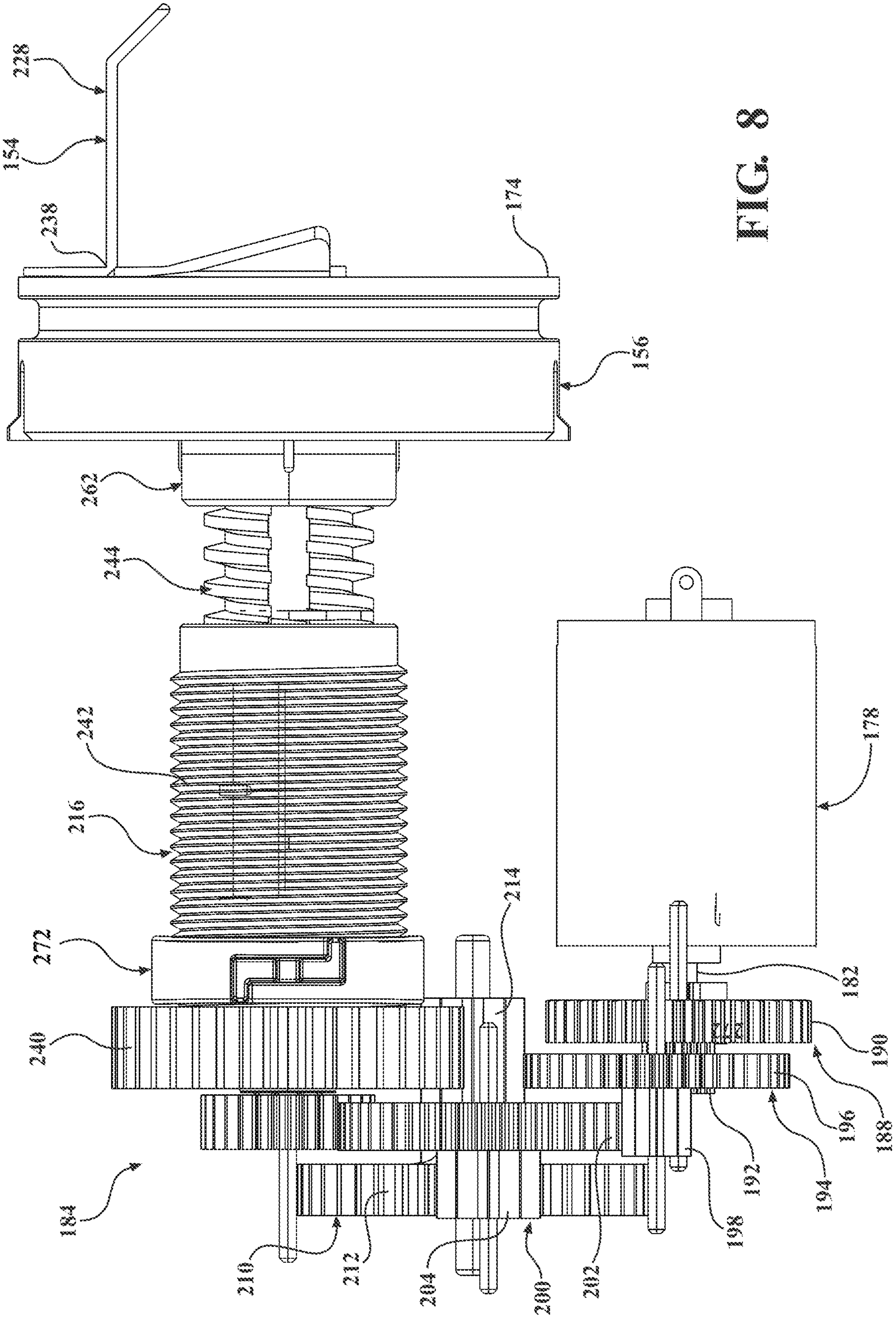
FIG. 8 is an elevation view of the geartrain, the piston, and the mixing paddle.
Figure 9:
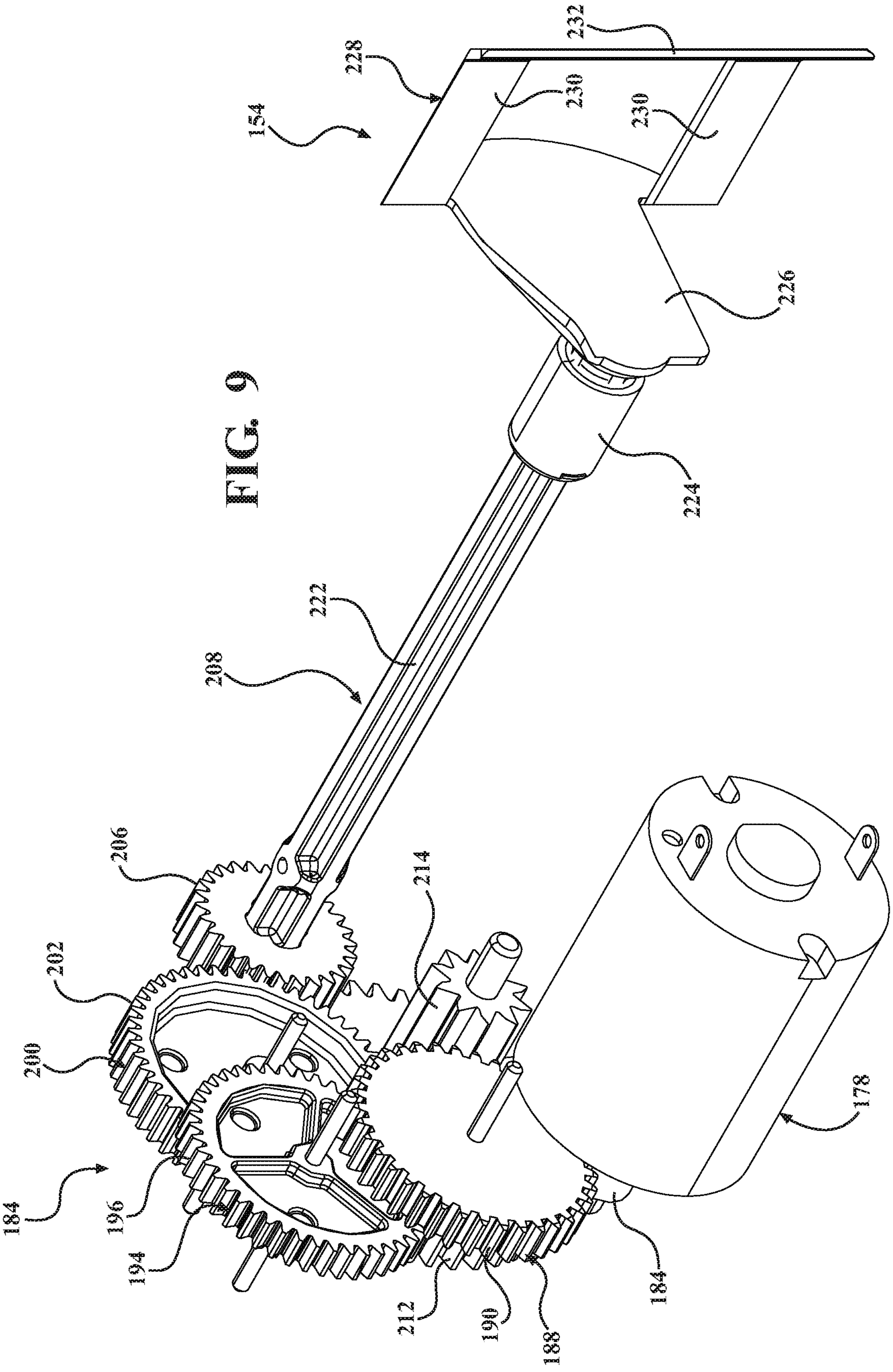
FIG. 9 is an elevation view of the geartrain and the mixing paddle of FIG. 7 with a transfer gear and a translation shaft removed to show the paddle drive gear coupling the mixing paddle to the geartrain.

The output shaft 182 is operably coupled to a geartrain 184 best shown in FIGS. 7-9. The geartrain 184 shown is a stacked spur configuration, but other suitable configurations are contemplated (e.g., planetary, helical spur, helical planetary, etc.). The geartrain 184 includes a pinion gear 186 coupled to the output shaft 182 of the motor 178. A first spur gear 188 is operably coupled to the pinion gear 186. The first spur gear 188 includes a first spur 190 having a larger outer diameter with the first spur 190 coupled to the pinion gear 186, and a second spur 182 having a smaller outer diameter. A second spur gear 194 is operably coupled to the first spur gear 188. The second spur gear 194 includes a first spur 196 having a larger outer diameter with the first spur 196 coupled to the second spur 182 of the first spur gear 188, and a second spur 198 having a smaller outer diameter. A third spur gear 200 is operably coupled to the second spur gear 194. The second spur gear 200 includes a first spur 202 having a larger outer diameter with the first spur 202 coupled to the second spur 198 of the first spur gear 194, and a second spur 204 having a smaller outer diameter. The third spur gear 200, and more particularly the first spur 202 of the third spur gear 200, is operably coupled to an input spur 206 of the paddle drive gear 208. The third spur gear 200 is also operably coupled to a fourth spur gear 210. The fourth spur gear 210 includes a first spur 212 having a larger outer diameter with the first spur 212 coupled to the second spur 204 of the third spur gear 200, and a second spur 214 having a smaller outer diameter coupled to a transfer gear 216 to be described. FIGS. 6 and 7 collectively show the geartrain 184 being disposed within front and rear geartrain housings 218, 220 operably coupled to one another. Further, the rear chamber housing 166 is operably coupled to the front geartrain housing 218.

In certain implementations, vibration and noise may be reduced by employing damping and/or vibration isolation between the motor 178 and/or geartrain 184, and complementary components of the geartrain housing 218. Damping may be achieved by manufacturing one or more gears from a reduced elastic modulus (i.e. more compliant) material, for example an elastomeric polyester such as Hytrel® produced by DuPont de Nemours, Inc. (Wilmington, Dela.). Isolation of vibration may be achieved by placing a compliant material, such as an elastomer or foam, between a vibrating component and adjacent components, for example between the motor 178 and adjacent portions of the geartrain housing 218 (see FIG. 6) or between the geartrain housings and the mixer housings. Other suitable locations for damping or isolation include the first and second spur gears 188, 200, which are rotating most quickly in the geartrain 184 and therefore responsible for the most noise. It is further contemplated that some compliance may be provided between the pinion gear 186 and the first spur gear 188 to further reduce noise as well as the sensitivity of alignment in the component stack.

With particular reference to FIG. 9, the mixing paddle 154 may be coupled to an end of an output shaft 222 of the paddle drive gear 208 that is coupled to the input spur 206. The output shaft 222 includes longitudinally extending rails configured to couple with complementary features within a stem 224 of the mixing paddle 154 to rotationally fix the mixing paddle 154 to the paddle drive gear 208. The mixing paddle 154 further includes a face portion 226 generally extending radially from the stem 224. The face portion 226 is positioned adjacent and rotatable relative to the face 174 of the piston 156, as appreciated from FIGS. 6 and 7. A mixing feature 228 is coupled to the face portion 226. The mixing feature 228 extends longitudinally forward of the face portion 226 and includes at least one leg 230 for agitating the mixture components during rotation of the mixing paddle 154. FIGS. 7 and 9 show two of the legs 230 coupled to one another with a head 232 to form a generally U-shaped mixing feature 228. Each of the legs 230 and the head 232 may be plate-like in construction with the head 232 angled inwardly relative to the legs 230 to impart collapsing or buckling of the mixing feature 228 relative to the face portion 226 during the compression and transferring phase in a manner to be described in greater detail. Other configurations of the mixing paddle 154 configurations are also contemplated.

In operation, the switch 180 is moved from the deactivated state to the activated state. The motor 178 draws power from the battery pack 176 or other power source and is operated to supply torque to the geartrain 184. This may be considered the initiation of the operational cycle, and more particularly the mixing phase of the operational cycle. According to known speed versus torque characteristics associated with gearing, the torque is transferred from the pinion gear 186 through each of the first, second, and third spur gears 188, 194, 200, and through the paddle drive gear 208 to the mixing paddle 154.

The step of rotating the mixing paddle 154 effectuates mixing of the bone cement components within the chamber 112. Referring again to FIG. 4, the mixing paddle 154 may be rotated while the piston 156 is positioned within the first region 158 of the chamber 112. Again, the face 174 of the piston 156 is located between the first end 162 of the chamber 112 and the boundary separating the first and second regions 158, 160, such that the mixing paddle 154 mixes the bone cement components with the chamber 112 at least substantially at atmospheric pressure. It is appreciated that a door 234 of the slider 150 is positioned to cover the inlet opening 136 during the operational cycle including the mixing phase to prevent egress of debris from the mixing device 102; however, the door 234 may not result in more than minimal pressurization of the chamber 112 during movement of the piston 156. The door 234 may be positioned between the aperture 135 defined by the housing 116 and the inlet opening 136 defined by the chamber 112 when the actuator 148 is in the second position. At least in part because the bone cement components are mixed in the chamber 112 at atmospheric pressure, a sealing element 236 disposed within the outlet port 108 of the mixing device 102 prevents egress or premature transferring of the bone cement mixture from the mixing device 102 to the delivery device 104. As a result, less complex and more cost-effective valves may be utilized to form the sealing element 236.

As further appreciated from FIG. 4, the legs 230 of mixing paddle 154 extend forward from the piston 156 such that the head 232 of the mixing paddle 154 is positioned near or adjacent the interior face 168 of the front chamber housing 164. The arrangement results in the mixing paddle 154 being capable of accessing substantially an entirety of the chamber 112 to prevent any portion of the bone cement components from being insufficiently mixed or agitated. In other words, the legs 230 may effectively dislodge any of the bone cement components adhering to a sidewall at least partially defining the chamber 112, and the head 232 may effectively dislodge any of the bone cement components adhering to the interior face 168 at least partially defining the chamber 112. As mentioned and as to be further explained, however, the piston 156 moves from the first region 158 to the second region 160 for the compression and transferring phase. As a result, the mixing paddle 154 must accommodate such longitudinal movement of the piston 156 within the chamber 112. To that end, the mixing paddle 154 is configured to collapse or buckle while the piston 156 is compressing the bone cement mixture in the chamber 112. The piston 156 and the mixing paddle 154 move along the longitudinal axis LA until the head 232 of the mixing paddle 154 encounters the interior face 168 of the front chamber housing 164. Owing to the inwardly angled orientation of the head 232 relative to the legs 230, the continued force provided by the piston 156 results in the legs 230 deforming at an interface 238 between the legs 230 and the face portion 226 (see FIGS. 7 and 8). The deformation may be considered buckling at pivot points induced by the interface 238. An axial profile of the face portion 226 relative to the face 174 of the piston 156 is shaped to accommodate the legs 230 and the head 232 such that when nearly or fully collapsed, the mixing feature 228 is substantially flat and in abutment or adjacent with the face 174 of the piston 156. Among other advantages, the arrangement allows the piston 156 to longitudinally move across nearly an entirety of the chamber 112 to compress and transfer the bone cement mixture through the outlet port 108 positioned near the second end 163 of the chamber 112 (see FIG. 5).

Figure 10:
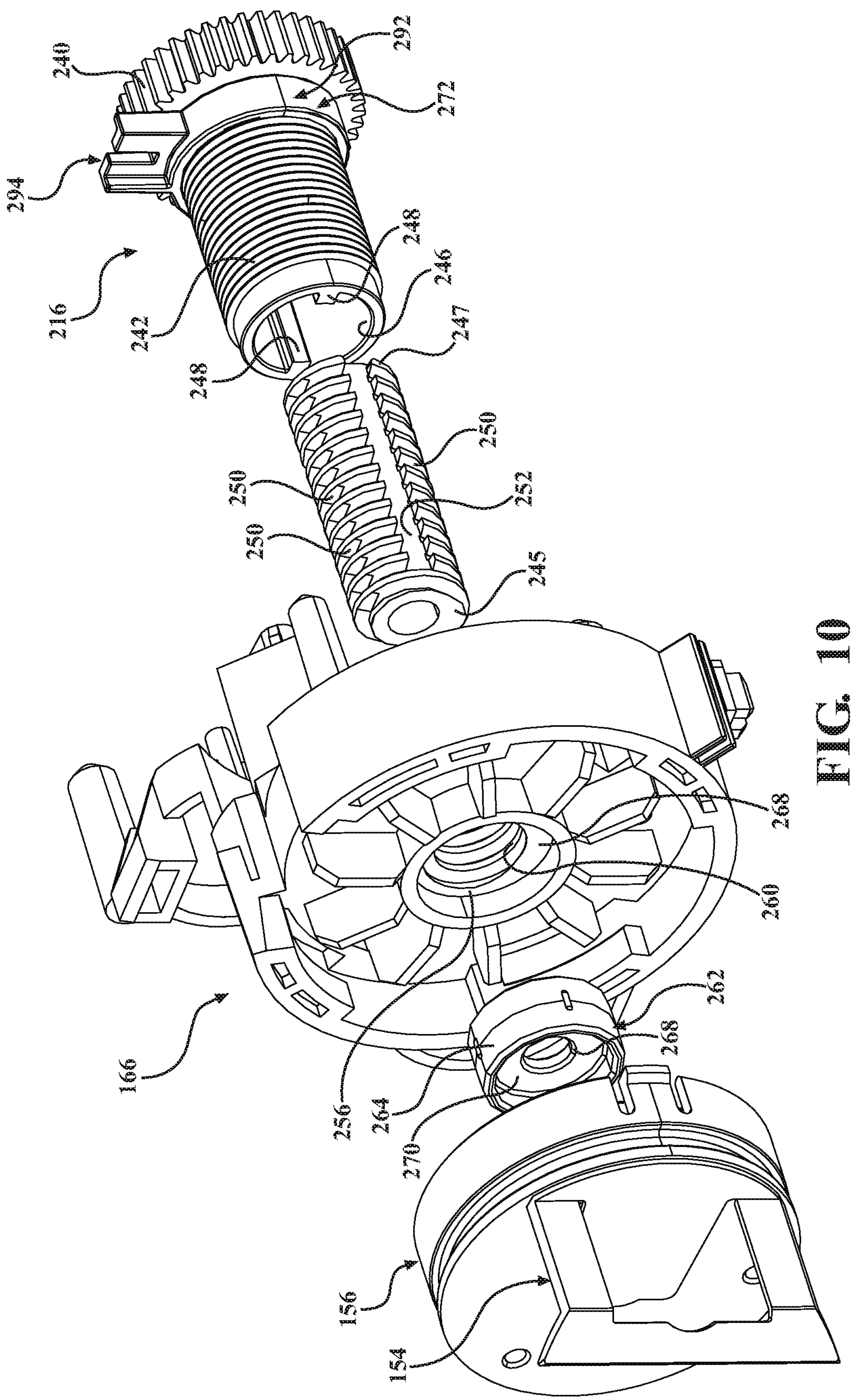
FIG. 10 is an exploded view of a subassembly of the mixing device configured to effectuate longitudinal movement of the piston (and the mixing paddle) within the chamber, the subassembly including the transfer gear, the translation shaft, a rear chamber housing, and a push cap.

The electromechanical operation of the mixing device 102 to impart longitudinal movement of the piston 156 (and the mixing paddle 154) will now be described with reference to FIGS. 4, 5, 8, 9 and 10. As mentioned, the fourth spur gear 210 includes the second spur 214 coupled to the transfer gear 216. FIGS. 7, 8 and 10 best show the transfer gear 216 including a transfer spur 240 and a threaded shaft 242 extending from the transfer spur 240. The transfer spur 240 is coupled to the second spur 214 of the fourth spur gear 210 such that rotation of the geartrain 184 including the fourth spur gear 210 imparts rotation to the transfer gear 216. The transfer gear 216, and more particularly the threaded shaft 242, defines a lumen 246 extending through the transfer gear 216, as best shown in FIG. 10. At least one rail feature 248 is disposed within the lumen 246 and oriented along a length of the lumen 246. FIG. 10 shows two rail features 248 positioned diametrically opposite one another. The lumen 246 is further defined by a front face (not identified) of the transfer spur 240 at the rear end of the lumen 246. A borehole (not shown) having a smaller diameter than the lumen 246 extends through the transfer spur 240 with the borehole sized to permit the output shaft 222 of the paddle drive gear 208 to be positioned through the transfer gear 216 as shown in FIGS. 4 and 5 and further generally appreciated from viewing FIGS. 7 and 9 in combination.

With particular reference to FIGS. 8 and 10, a translating shaft 244 is movably disposed within the lumen 246 of the transfer gear 216. The translating shaft 244 includes an outer diameter smaller than the inner diameter of the lumen 246 to be slidably movable within the lumen 246. Further, the translating shaft 244 includes threads 250 disposed about an outer surface with function to be described. The threads 250 may define at least one slot 252 extending longitudinally between opposing ends 245, 247 of the translating shaft 244. FIG. 10 identifies one slot 252, but it is appreciated there is another slot diametrically opposite with the slots 252 configured to engage the rail features 248 of the transfer gear 216. The engagement of the rail features 248 and the slots 252 prevents relative rotation while permitting translation between the translating shaft 244 and the transfer gear 216. The translating shaft 244 may also define a lumen 254 extending between the opposing ends 245, 247 with the lumen 254 sized to permit the output shaft 222 of the paddle drive gear 208 to be positioned through the translating shaft 244 as shown in FIGS. 4 and 5 and further generally appreciated from viewing FIGS. 7 and 9 in combination. Thus, the paddle drive gear 208, the translating shaft 244, and the transfer gear 216 may be in a coaxial arrangement.

A biasing element (not shown), for example a coil spring, is disposed within the lumen 246 of the transfer gear 216. The biasing element includes an end positioned in abutment with the transfer spur 240, and another end positioned in abutment with the rear end 247 of the translating shaft 244. The biasing element urges the front end 245 opposite the rear end 247 of the translating shaft 244 towards and into contact with the rear chamber housing 166. With continued reference to FIG. 10, the rear chamber housing 166 defines an aperture 256 with internal threads 258. The aperture 256 may be coaxially aligned with the paddle drive gear 208, the translating shaft 244, and/or the transfer gear 216. The aperture 256 is sized to permit the output shaft 222 of the paddle drive gear 208 to be positioned through the rear chamber housing 166, and further sized such that the internal threads 258 are configured to threadably engage the threads 250 of the translating shaft 244. It is appreciated that the rear chamber housing 166 is a stationary component of the mixing device 102 such that threadable engagement between the internal threads 258 and the threads 250 of the translating shaft 244 imparts translational movement of the translating shaft 244 relative to the rear chamber housing 166 (and relative to the transfer gear 216).

The rear chamber housing 166 may define a bore 260 in communication with the aperture 256 and positioned on a side of the rear chamber housing 166 opposite the translating shaft 244. The bore 260 is sized to initially receive at least a portion of a push cap 262. FIG. 10 shows the push cap 262 as a ring-like structure including an outer portion 264 sized to be received within the bore 260 and positioned adjacent a front face 266 of the bore 260 adjacent the internal threads 258. The push cap 262 includes an aperture 268 sized to permit the output shaft 222 of the paddle drive gear 208 to be positioned through the push cap 262. The outer portion 264 of the push cap 262 opposite that engaging the front face 266 is configured to engage an annular slot (not shown) on a rear side of the piston 156.

In operation, the switch 180 is moved from the deactivated state to the activated state. The motor 178 draws power from the battery pack 176 and is operated to supply torque to the geartrain 184 to activate the mixing paddle 154. As previously described, this may be considered the initiation of the mixing phase of the operational cycle, and torque is transferred from the pinion gear 186 through each of the first, second, and third spur gears 188, 194, 200, and through the paddle drive gear 208 to the mixing paddle 154 in the geartrain 184 shown. The mixing paddle 154 begins rotating immediately. Simultaneously, torque is transferred through each of the first, second, and third spur gears 188, 194, 200, and from the fourth spur gear 210 to the transfer gear 216. The transfer gear 216 beings rotating immediately, albeit at a different speed than that of the mixing paddle 154. Owing to the rotational constraint provided by the rail features 248 of the transfer gear 216 engaging the slots 252 of the translating shaft 244, the translating shaft 244 rotates with the transfer gear 216. Meanwhile, the biasing element urges the front end 245 into contact with the rear chamber housing 166 such that the threads 250 of the translating shaft 244 being to engage the internal threads 258 of the rear chamber housing 166. The threadable engagement of the threads 250, 258 results in translating movement of the translating shaft 244 relative to the transfer gear 216. In other words, the translating shaft 244 may be simultaneously rotating and translating.

As mentioned, at least a portion of the push cap 262 is initially situated within the bore 260 adjacent the front face 266. Further, FIG. 10 shows the aperture 256 of the rear chamber housing 166 having a depth or length defined between the front face 266 opposite a rear face (not shown). The depth of the aperture 256 is the distance the translating shaft 244 is required to travel before the front end 245 of the translating shaft 244 engages an inner portion 270 of the push cap 262, and consequently moves the push cap 262 to move the piston 156. This distance, in combination with the thread pitch of the threads 250, 258, is specifically tailored to provide a time lag between the mixing phase of the operational cycle and the compression and transferring phase of the operational cycle. In other words, during the time lag that the translating shaft 244 is moving through the depth of the aperture 256, the mixing paddle 154 is rotating and mixing the bone cement components in the manner previously described. In one example, the time lag is thirty seconds; however, other timeframes are contemplated. Once the translating shaft 244 urges the push cap 262 into the piston 156, a continued torque provided through the geartrain 184 causes the piston 156 to move along the longitudinal axis. This may be considered a transition phase of the operational cycle, as the piston 156 is moving but the face 174 of the piston 156 has yet to enter the second region 160 of the chamber 112 (e.g., the face 174 of the piston 156 may have only partially passed the inlet opening 136). Thus, the chamber 112 may remain generally at atmospheric pressure during the transition phase. It is further appreciated that, at least for a brief period, the piston 156 may be moving along the longitudinal axis LA while the mixing paddle 154 is fully extended and rotating (as the head 232 of the mixing paddle 154 has yet to contact the interior face 168 and begun to collapse or buckle as previously described).

Relative to FIG. 4, FIG. 5 shows the translating shaft 244 moved along the longitudinal axis LA and spaced apart from the rear chamber housing 166 with the push cap 262 and the piston 156 moving in a corresponding manner (the mixing paddle 154 is removed for clarity). As previously mentioned, the face 174 of the piston 156 passes the inlet opening 136, and more particularly the end 172 of the inlet opening 136, such that a fluid-tight closure is formed between the piston 156 and the housing 116 to seal the chamber 112 from the ambient. FIG. 5 shows the face 174 of the piston 156 in the second region 160. The piston 156 compresses the bone cement mixture in the chamber 112 to a pressure greater than atmospheric pressure, and the bone cement may also be transferred to the delivery device 104 through the outlet port 108 in communication with the chamber 112. From the above description, it is readily appreciated that through a single actuation of the switch 180, the mixing device 102 advantageously performs the mixing phase and the time-lagged compression and transferring phase in a manner that mixes the bone cement components at atmospheric pressure and compresses and transfers the bone cement mixture in a self-sealing, closed system.

Moreover, the mixing device 102 is further configured to automatically terminate the operational cycle after a predetermined period that is based on the end of the mixing, compression and transferring phases. Referring again to FIGS. 4 and 5 and with further reference to FIGS. 11-14, the user actuates the actuator 148, for example the slider 150 movably coupled to the housing 116 to initiate the operational cycle. The slider 150 and the switch 180 are complementarily arranged such that movement of the slider 150 from a first position (see FIG. 1) to a second position (see FIGS. 4, 5, 11, 12 and 17), moves the switch 180 from the deactivated state to the activated state to initiate the operational cycle. In one implementation, the switch 180 may be biased to the deactivated state; and with the slider 150 in the second position, the switch 180 is maintained in the activated state against the bias. When the piston 156 is within the second region 160, the actuator 148 is mechanically disengaged from the switch 180 to permit the biased return of the switch 180 from the activated state to the deactivated state. In one example and in a manner to be explained in greater detail, a stop nut 272 is configured to disengage the slider 150 from the switch 180, thereby permitting the bias of the switch 180 to return it to the deactivated state to terminate the operational cycle. In another example, a structure coupled to the piston 156 such as a flange or arm, may disengage the slider 150 from the switch 180, thereby permitting the bias of the switch 180 to return it to the deactivated state. In another implementation to be described in greater detail, the stop nut 272' is configured to engage a second switch 181' to return the mixing device 102 to the deactivated state to terminate the operational cycle. In still another example, an action may occur such as a cable being severed when the piston 156 is appropriately within the second region 160 with the action resulting in the bias of the switch 180 to return it to the deactivated state. Alternatively, it is contemplated that the switch 180 is a non-momentary switch, as mentioned, and when the piston 156 is within the second region 160, the switch 180 is automatically and mechanically moved to the deactivated state to terminate the operational cycle and deactivate the motor 178.

Figure 11:
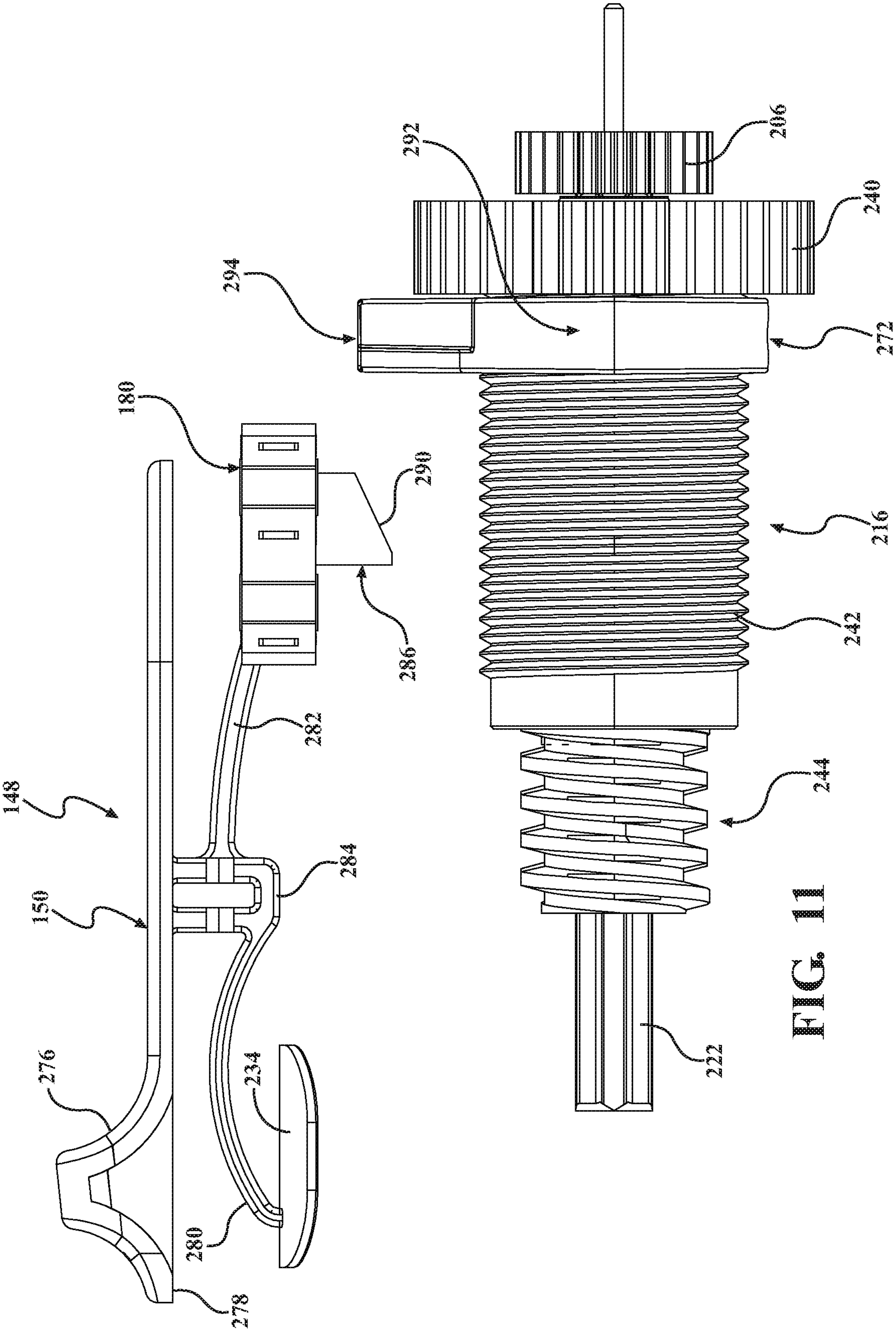
FIG. 11 an elevation view of components of the mixing device configured to effectuate automatic termination of the operational cycle, the components including a stop nut disposed on the transfer gear in a first position.
Figure 12:
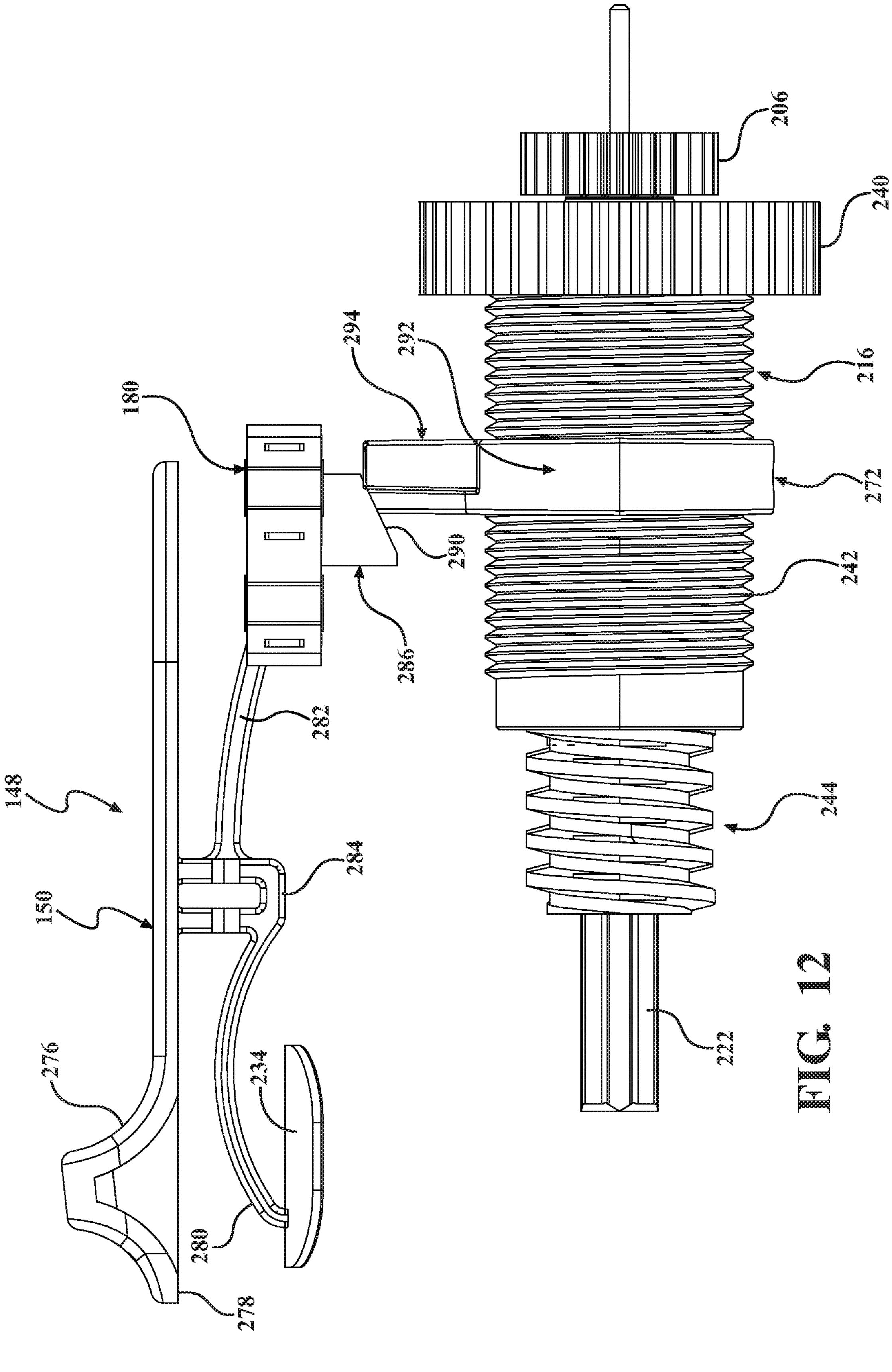
FIG. 12 an elevation view of the components of FIG. 11 with the stop nut disposed on the transfer gear in a second position and engaging an actuator.
Figure 13:
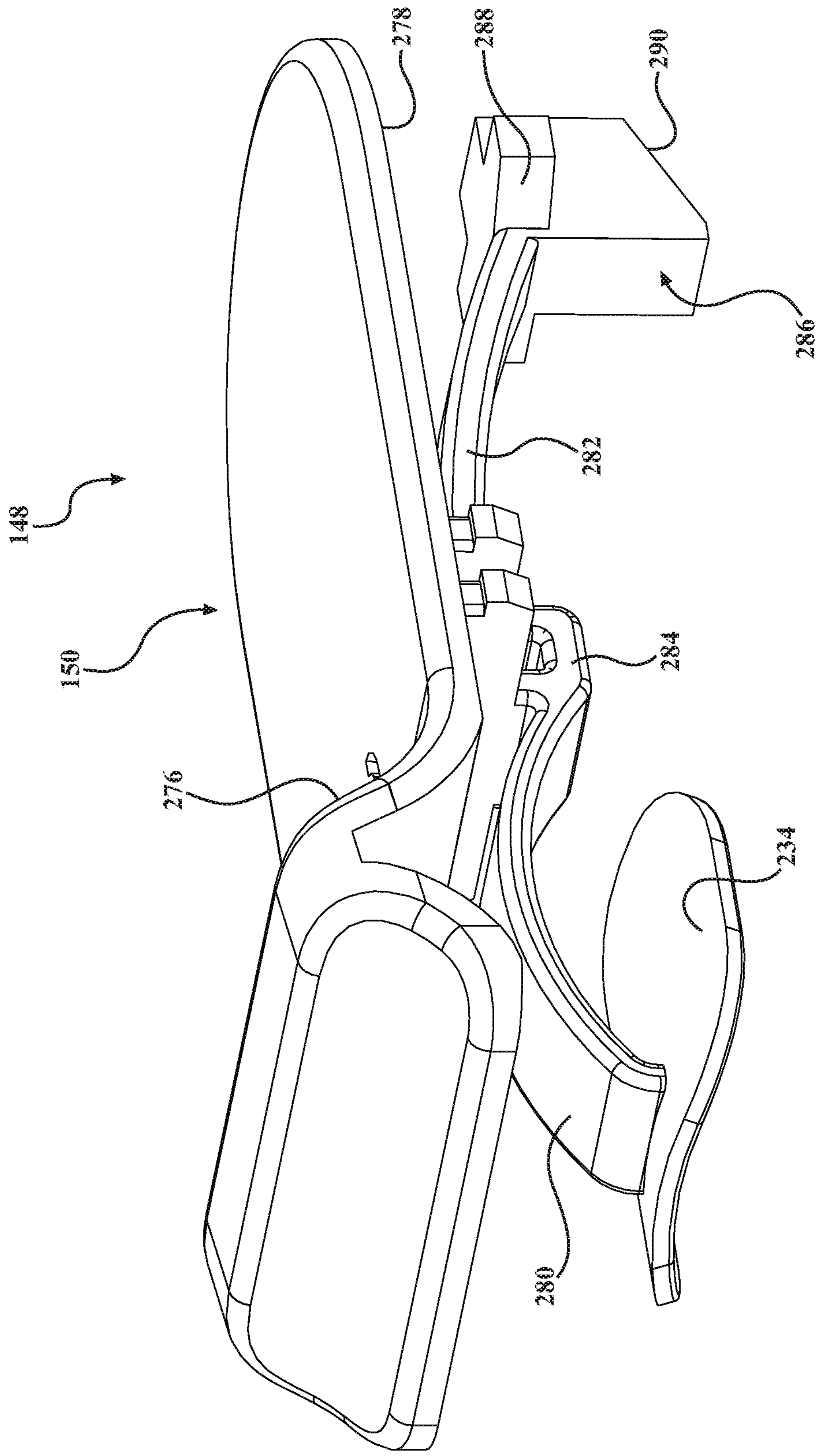
FIG. 13 is a perspective view of a slider forming the actuator.

FIG. 13 is a perspective view of the slider 150 forming the actuator 148. The slider 150 includes a slider body 274 including a control surface 276 opposite an underside 278. The control surface 276 may be considered the surface configured to receive the user input, for example to move the slider 150 from the first position to the second position. The slider 150 also includes a first arm 280 and a second arm 282 separate from the first arm 280. The first and second arms 280, 282 extend from or are coupled to the underside 278. In particular, FIGS. 11-13 show the slider body 274 of the slider 150 including a projection 284 extending downwardly from the underside 278 with each of the first and second arms 280, 282 extending generally laterally from the projection 284. The projection 284 serves to space apart the first and second arms 280, 282 from the underside 278 of the slider body 274 such that the first and second arms 280, 282 are disposed within the interior 124 of the housing 116 while the slider body 274 including the control surface 276 are external to the housing 116 for user actuation.

Figure 15:
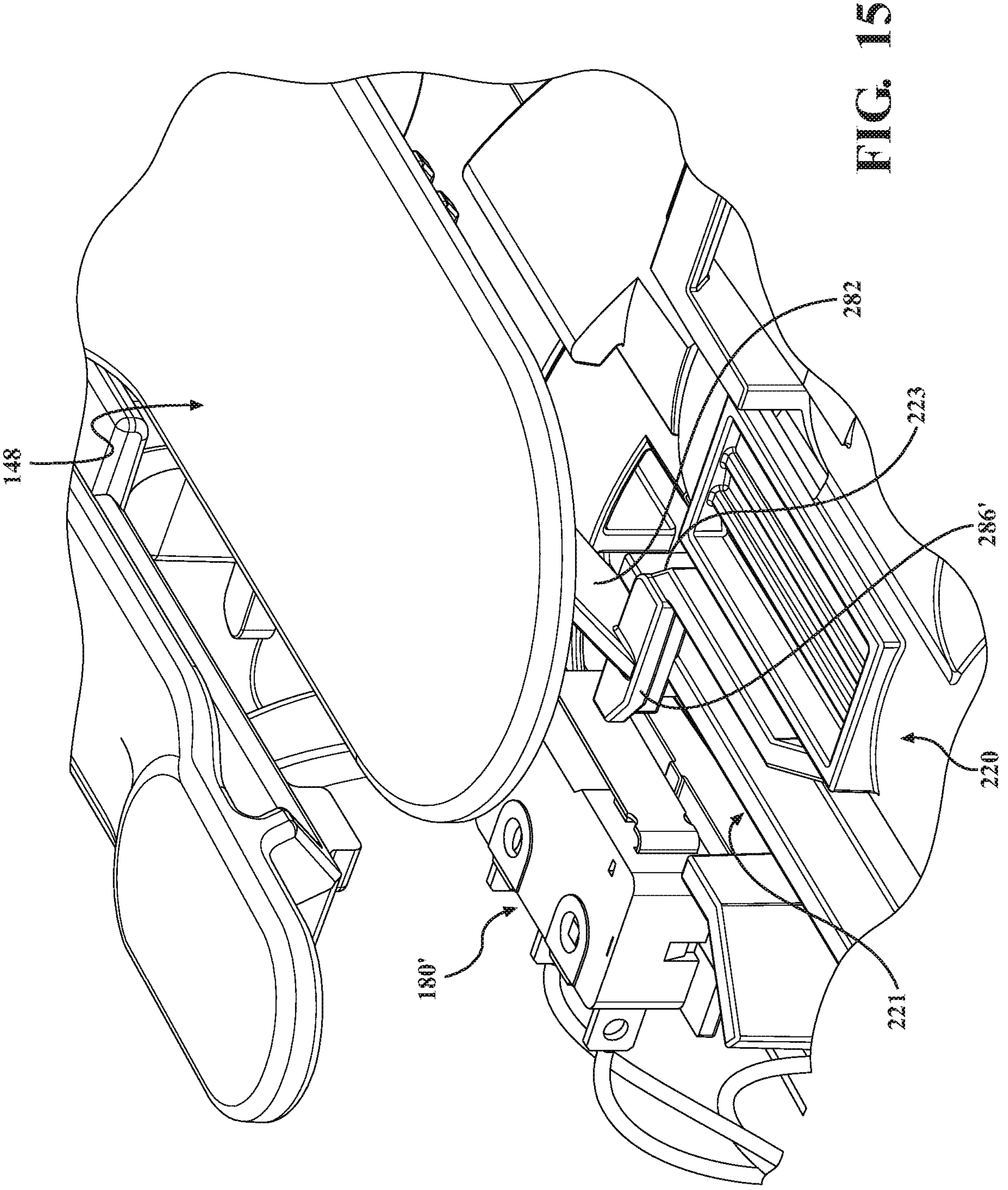
FIG. 15 is a top perspective view of a portion of the mixing device in which an implementation of the actuator is laterally deflected into engagement with an implementation of the switch.

The door 234 is coupled to the first arm 280. The door 234, as previously mentioned, is sized and contoured to cover the inlet opening 136 of the chamber 112, more particularly, when the slider 150 is in the second position. The door 234 covering the inlet opening 136 provides a closure that is not pressurized and may not be considered fluid-tight, yet prevents egress of the bone cement components from the chamber 112 during the mixing phase of the operational cycle. An engagement member 286 is coupled to the second arm 282 and includes a stop feature 288 and a ramping surface 290. FIG. 13 shows the stop feature 288 as a flange extending laterally from the engagement member 286. As the slider 150 is moved from the first position to the second position, the stop feature 288 of the engagement member 286 engages the switch 180 to move the switch 180 from the deactivated state to the activated state. The stop feature 288 further maintains the switch 180 in the activated state against the internal bias of the switch 180 until disengaged from the switch 180 by the stop nut 272 in a manner to be further explained. FIGS. 11, 12 and 15 show the slider 150 in the second position such that the switch 180 is engaged and in the activated (several supporting structures of FIGS. 11, 12, 15 and 16 are removed for clarity to show relative positions between the components shown).

Figure 14:
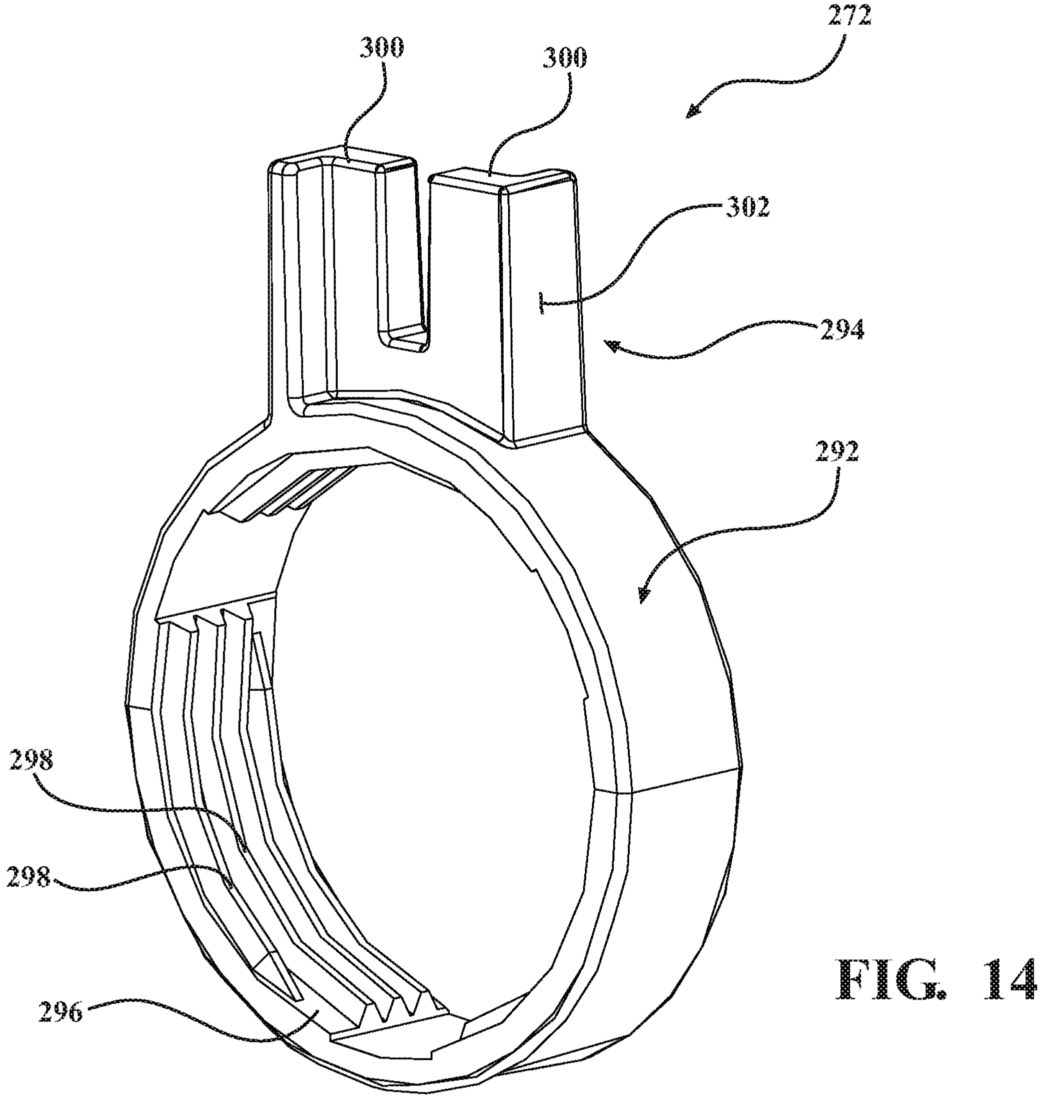
FIG. 14 is a perspective view of the stop nut.

FIG. 14 shows the stop nut 272 including a nut portion 292 and a flange portion 294. The nut portion 292 is ringed-shaped in construction and includes a lumen 296 and internal threads 298 sized and shaped to threadably engage the threaded shaft 242 of the transfer gear 216 (see FIGS. 4, 5, 7 and 10-12). The flange portion 294 includes at least one flange 300 extending generally radially outwardly from an outer surface of the nut portion 292. FIG. 14 shows two of the flanges 300 separated by a slot, but a singular flange is also contemplated. Each of the flanges 300 include a lateral surface 302 configured to engage surfaces defining a slot 304 in the upper shell 120 of the housing 116. With reference to FIG. 6, one of the flanges 300 is shown disposed within the slot 304. As a result, rotation of the stop nut 272 relative to the housing 116 is prevented, and thus rotation of the transfer gear 216 results in translation of the stop nut 272 along the threaded shaft 242 of the transfer gear 216.

In operation, the user provides the input to the actuator 148, for example at the second step of the intuitive workflow. The slider 150 is moved from the first position to the second position. The door 234 coupled to the first arm 280 is moved to cover the inlet opening 136, and the stop feature 288 coupled to the second arm 282 is moved to engage the switch 180 and move the switch 180 from the deactivated state to the activated state. Thus, the single action of providing the input to the actuator 148, simultaneously provides a barrier over the inlet opening 136 and initiates the operational cycle. At this point, the mixing device 102 may be as shown in FIG. 4, and the stop nut 272 is positioned on the threaded shaft 242 near or adjacent the transfer spur 240. The internal threads 298 of the nut portion 292 are engaging the threads of the threaded shaft 242. With the switch 180 in the activated state, the motor 178 supplies the torque to the geartrain 184, namely through each of the first, second, and third spur gears 188, 194, 200, and from the fourth spur gear 210 to the transfer gear 216. As transfer gear 216 rotates and with the stop nut 272 prevented from rotation (owing to the lateral surfaces 302 of the flange portion 294 disposed within the slot 304 of the housing), the stop nut 272 translates along the threaded shaft 242. With reference to FIG. 12, the flange portion 294 of the stop nut 272 eventually encounters the engagement member 286, and more particularly the ramping surface 290 of the engagement member 286. The second arm 282 of the slider 150 is configured to flex, and with further translation of the stop nut 272 along the threaded shaft 242, the flange portion 294 engages the ramping surface 290 to upwardly flex the second arm 282 and the engagement member 286 coupled to the second arm 282. The extent of the flexion is such that the stop feature 288 disengages from the switch 180 (i.e., moved upwardly out of interference), and the switch 180 is permitted to automatically return to the deactivated state under its internal bias. With the switch 180 in the deactivated state, the motor 178 ceases operation and the movement of the piston 156 and the rotation of the mixing paddle 154 is ceased, which may be considered the end of the operational cycle. It should be appreciated that a single component that may be molded and inexpensive, facilitates the barrier over the inlet opening 136, initiating the operational cycle, and ceasing the operational cycle.

Figure 16:
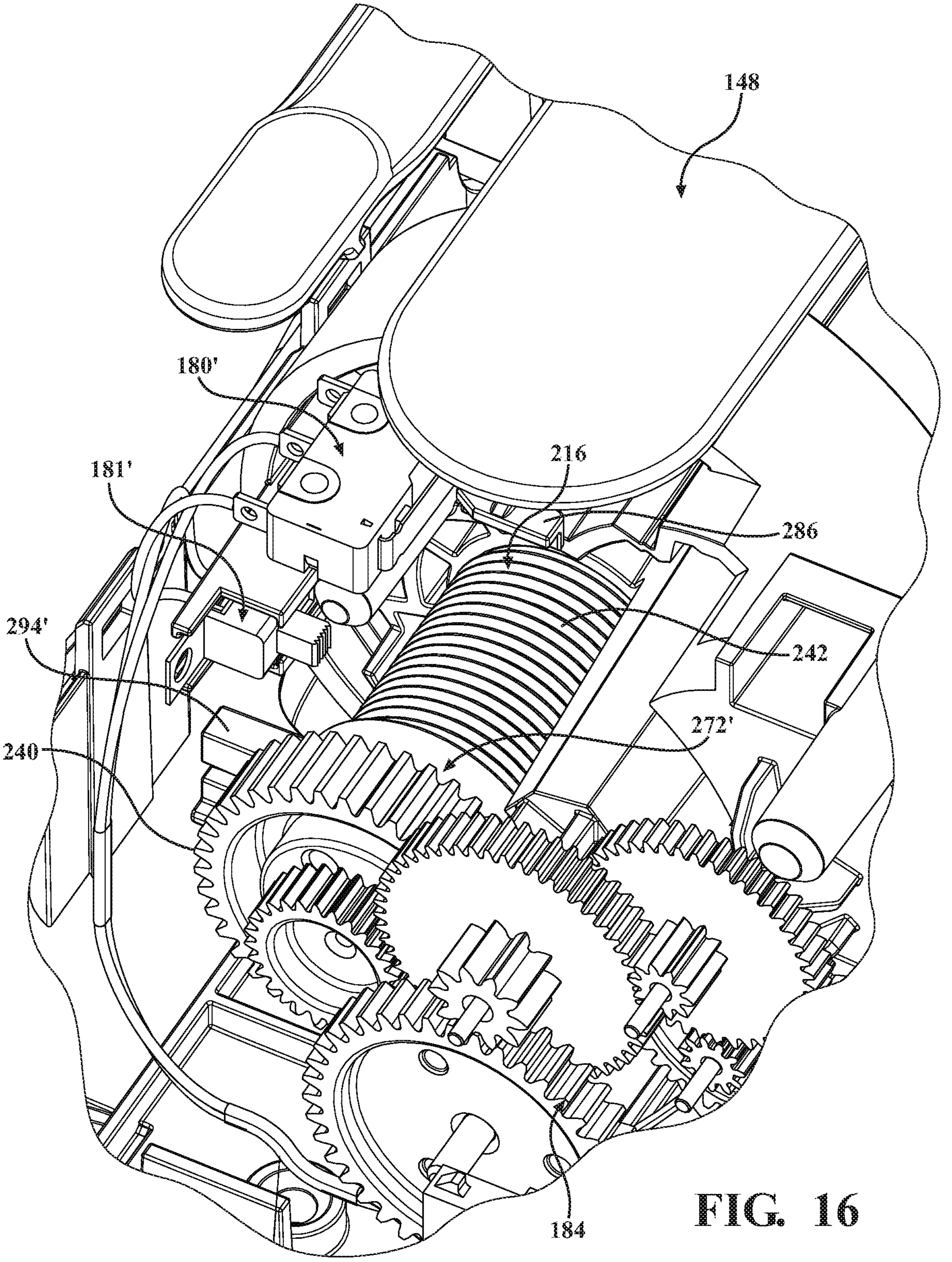
FIG. 16 a top perspective view of a portion of the mixing device which an implementation of the stop nut is configured to engage a second switch to effectuate automatic termination of the operational cycle.

Another implementation by which the mixing device 102 automatically terminates the operational cycle after a predetermined period is described with reference to FIGS. 15 and 16. FIG. 15 shows the actuator 148 in the second position, i.e., after receiving the input, to contact the switch (hereinafter first switch 180') to initiate the operational cycle. The first switch 180' is a momentary switch internally biased to the deactivated state. As the actuator 148 is moved from the first position to the second position, the second arm 282 translates down a channel 221 within the front and/or rear geartrain housings 218, 220 and encounters a ramped surface 223 defining the channel 221. The second arm 282 may deflect laterally (to the left in FIG. 15) to contact the first switch 180'. The first switch 180' is moved from the deactivated state to the activated state by the mechanical force from the engagement member 286' of the second arm 282. The second arm 282 may be constrained from resiliently flexing to its original position by the ramped surface 223 of the rear geartrain housings 218, 220. The mixing device 102 initiates the operational cycle as previously described.

With the switch 180' in the activated state, the motor 178 supplies the torque to the geartrain 184, namely through each of the first, second, and third spur gears 188, 194, 200, and from the fourth spur gear 210 to the transfer gear 216. FIG. 16 shows the stop nut 272' threadably engaged with the transfer gear 216 with the flange portion 294' extending laterally from the same. The stop nut 272' is prevented from rotation as the stop nut 272' translates along the threaded shaft 242. The mixing device 102 includes a second switch 181' separate from the first switch 180'. The second switch 181' is coupled to the housing 116 so as to be aligned with the flange portion 294' of the stop nut 272'. The second switch 181' may be a non-momentary switch initially in the activated state. Once the stop nut 272' translates along the threaded shaft 242, the flange portion 294' of the stop nut 272' eventually encounters the second switch 181' to move the second switch 181' from the activated state to the deactivated state. With the switch 181' in the deactivated state (even with the first switch 180' remaining in the activated state), the motor 178 ceases operation and the movement of the piston 156 and the rotation of the mixing paddle 154 is ceased, which may be considered the end of the operational cycle. The elapsed time of the operational cycle may be specifically tuned as desired. Based on distance the stop nut 272 must travel along the threaded shaft 242 to encounter the second switch 181'.

The first and second switches 180', 181' may be wired in series between the battery 176 and the motor 178. Thus, with either the first switch 180' or the second switch 181' in the deactivated stated, the motor 178 is inoperable. In the above example, the first switch 180' was initially in the deactivated state, and the second switch 181' was initially in the activated state. Once the input from the user moves the actuator 148, both the first and second switch 180', 181' are in the activated state, and the motor 178 is operational. Once the stop nut 272' eventually encounters the second switch 181', the second switch 181' is in the deactivated state, and the first switch is in the activated state; the motor 178 is again inoperable. The motor 178 ceases operation and the movement of the piston 156 and the rotation of the mixing paddle 154 is ceased, which may be considered the end of the operational cycle.

Figure 17:
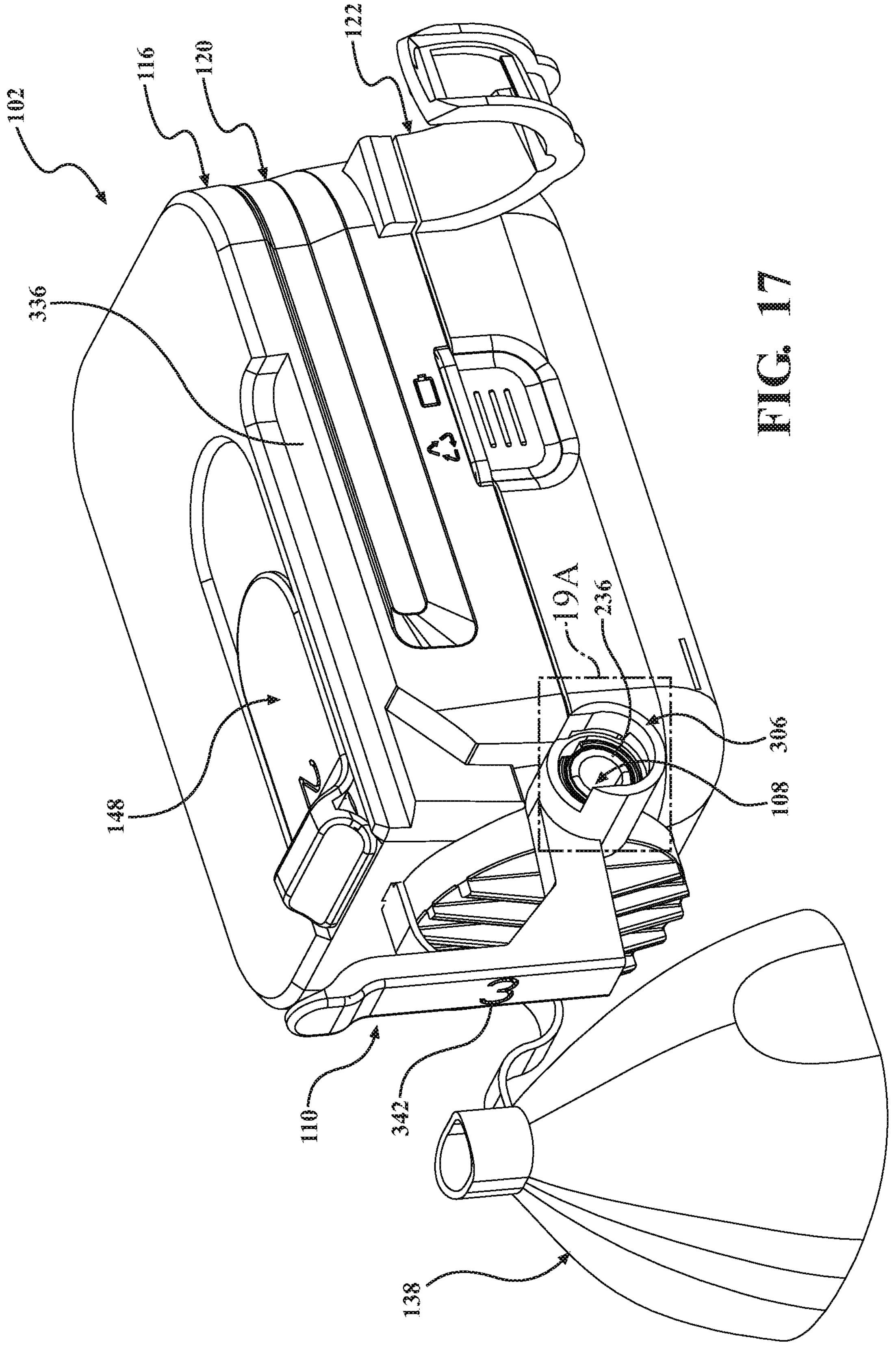
FIG. 17 is a rear perspective view of the mixing device with a release assembly in an unlocked position.
Figure 18:
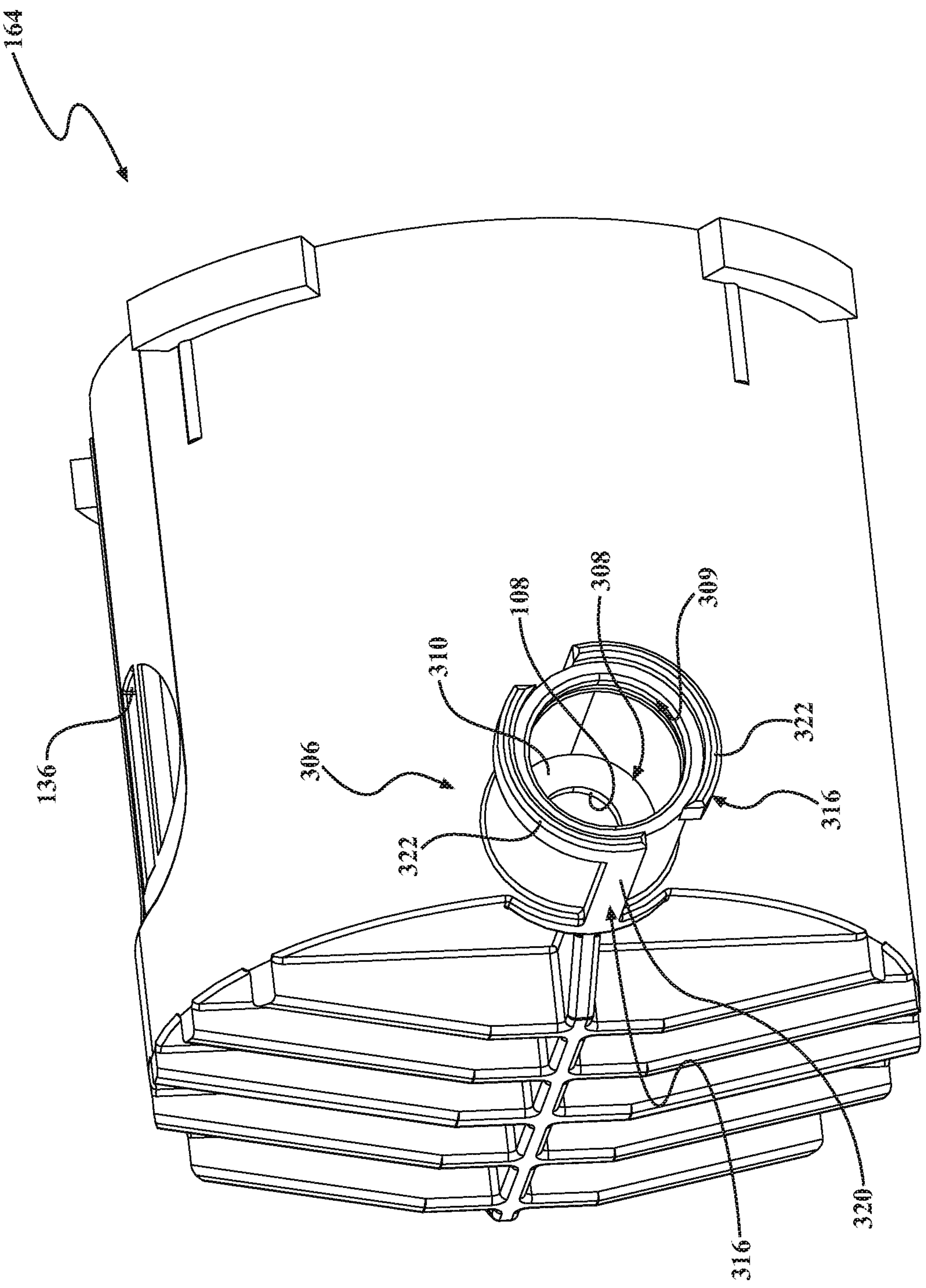
FIG. 18 is a perspective view of a front chamber housing including a transfer conduit.
Figure 19A:
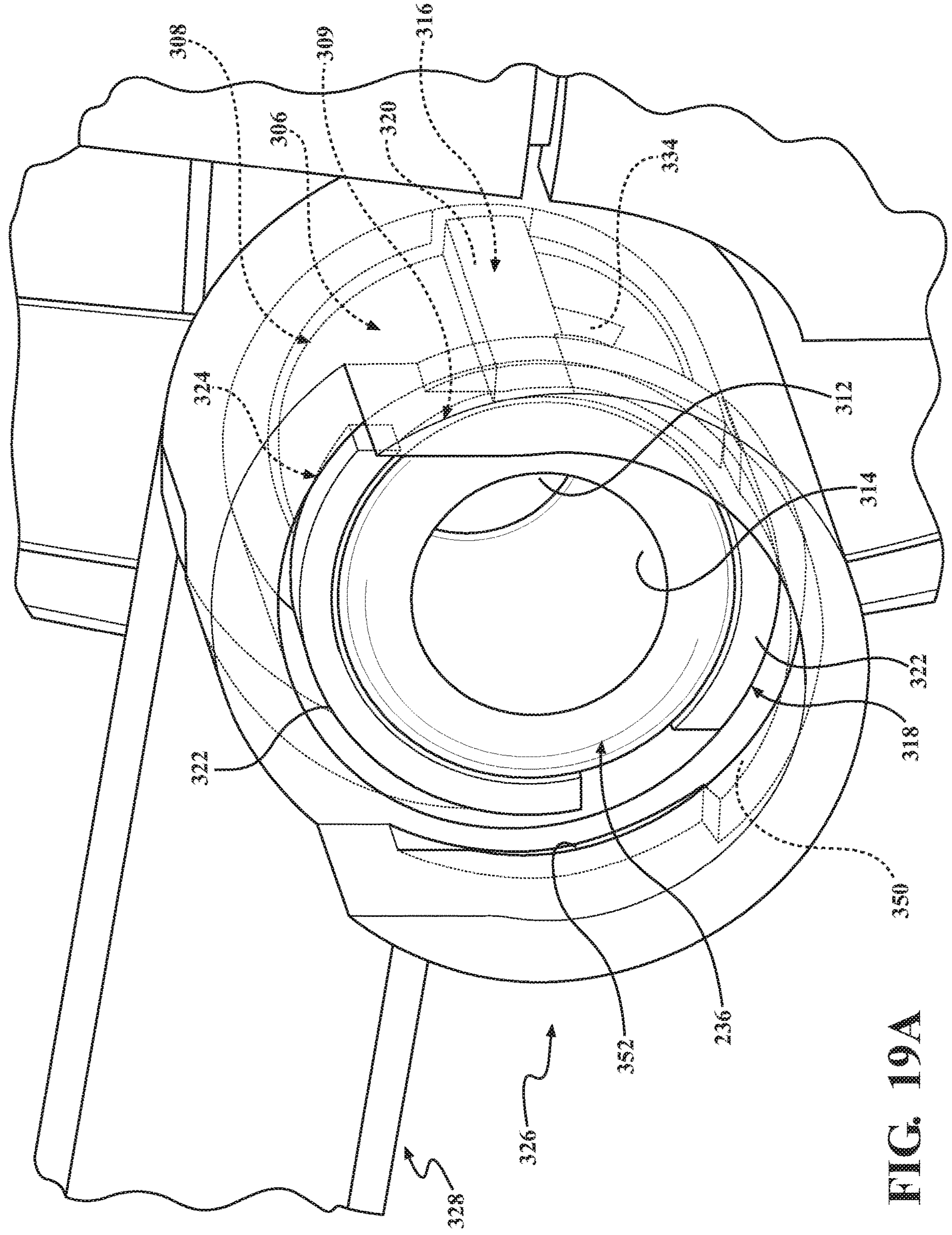
FIG. 19A is a detailed view of the transfer conduit and release assembly of FIG. 17 within broken lines 19A-19A.

As mentioned, the delivery device 104 is removably coupled to the mixing device 102 to establish communication between the inlet and outlet ports 106, 108 for transferring the bone cement mixture, and the release assembly 110 facilitates the removable connection between the mixing device 102 and the delivery device 104. FIGS. 1 and 2 show the release assembly 110 in an initial or locked position. The release assembly 110 is configured to be moved from the initial or locked position to an unlocked position to permit decoupling of the delivery device 104 from the mixing device 102. FIGS. 17 and 19A show the release assembly 110 in the unlocked position. Referring now to FIGS. 17-20 the housing 116 includes a transfer conduit 306 in communication with the outlet port 108. As best shown in FIG. 18, the transfer conduit 306 may include a boss extending outwardly from the front chamber housing 164. A first end 308 of the transfer conduit 306 may include an interior wall 310 defining the outlet port 108. Alternatively, the interior wall 310 may be associated with the sidewall of the front chamber housing 164. A length of the transfer conduit 306 is defined between the first end 308 opposite a second end 309 with the length sized to receive the sealing element 236, as shown in FIG. 19A. In particular, the sealing element 236 may be bucket-shaped with a slit or self-closing orifice (not identified) within its base 312 with the base 312 positioned adjacent or in abutment with the interior wall 310 of the transfer conduit 306. The slit or self-closing orifice is configured to open when subjected to sufficiently high pressures from the bone cement mixture within the chamber 112, in particular during the compression and transfer phase of the operational cycle. During the mixing phase of the operational cycle performed at or near atmospheric pressure, by contrast, the slit or self-closing orifice is capable of preventing premature egress of the bone cement components or mixture. The sealing element 236 may include at least one sidewall 314 extending from the base 312 and terminating near the second end 309 of the transfer conduit 306. An inner diameter defined at least partially by the sidewall 314 is sized to removably receive a complementary male component of the delivery device 104 to provide the sealed fluid communication between the outlet port 108 of the mixing device 102 and the inlet port 106 of the delivery device 104.

With continued reference to FIGS. 18 and 19A, the transfer conduit 306 may include first coupling feature 316 and/or second coupling feature 318 configured to selectively engage complementary features of the release assembly 110 to be described to facilitate the desired movement and operation of the release assembly 110. The first coupling feature 316 may be a rib 320 extending along an outer surface of the transfer conduit 306, in particular extending between the first and second ends 308, 309. FIGS. 18 and 19A, when viewed on combination, show two of the ribs 320 positioned diametrically opposite one another. The first coupling feature 316 is configured to provide interference to limit range of motion of the release assembly 110 relative to the transfer conduit 306 in a manner to be described. In one example the maximum range of motion is ninety degrees of counterclockwise rotation, for example as shown in FIG. 17 relative to FIG. 1. The second coupling feature 318 may include a rib 322 extending along the outer surface of the transfer conduit 306, in particular subtending an arc at or near the second end 309. FIGS. 18 and 19A, show two of the ribs 322 positioned diametrically opposite one another. The ribs 322 are configured to axially retain the release assembly 110 on the transfer conduit 306. Moreover, the transfer conduit 306 may include at least one defeatable feature 324 (one identified as hidden but not shown in FIG. 19A), for example a protrusion or bump-like structure extending outwardly from the outer surface of the transfer conduit 306. The defeatable feature 324 may be positioned adjacent (behind) one or both of the ribs 322 forming the second coupling feature 318. The defeatable feature 324 is configured to maintain the release assembly 110 in the locked position to avoid inadvertent unlocking of the delivery device 104 from the mixing device 102. Once an input from the user is provided to the release assembly 110 with suitable force to overcome the interference engagement of the defeatable feature 324, the release assembly 110 may be moved to the unlocked position.

The release assembly 110 will be described with reference to FIGS. 19A and 20. The release assembly 110 includes a head portion 326 and a body portion 328 coupled to the head portion 326. The head portion 326 may be generally tubular in form and include at least one sidewall 330 defining a lumen 332. An inner diameter of the lumen 332 is slightly greater than an outer diameter of the transfer conduit 306 such that the head portion 326 receives the transfer conduit 306 in the lumen 332, as shown in FIG. 19A. The head portion 326 includes at least one projection 334 extending inwardly from the sidewall 330 and positioned within the lumen 332. The at least one projection 334 may be two projections (one shown) positioned diametrically opposite to one another. The projections 334 are configured to cooperate with the first coupling feature 316, namely the ribs 320, to limit the range of motion of the release assembly 110. FIG. 19A shows one of the projections 334 engaging one of the ribs 320 with the release assembly 110 in the unlocked configuration such that the release assembly 110 has a maximum range of motion of counterclockwise rotation of ninety degrees relative to the locked configuration. Further, the projections 334 selectively engage the second coupling feature 318, namely the ribs 322, to prevent axial removal of the release assembly 110 from the transfer conduit 306. More particularly, during assembly of the mixing device 102, prior to the coupling of the upper shell 120 of the housing 116 with the lower shell 122 of the housing 116, the projections 334 are directed through gaps defined between the ribs 322 forming the second coupling feature 318. At this time, the release assembly 110 is in an exaggerated clockwise orientation relative to the locked position. The release assembly 110 is rotated counterclockwise such that the projections 334 assume a position behind the ribs 322, and the upper shell 120 of the housing 116 with the lower shell 122 of the housing 116. The interference between the body portion 328 of the release assembly 110 and the upper shell 120 of the housing 116 prevents clockwise rotation of the release assembly 110 in which the projections 334 may again become aligned with the gaps (thereby permitting axial removal of the release assembly 110). With the body portion 328 of the release assembly 110 supported on a recess 336 defined within the upper shell of the housing 116 (see FIG. 17), the release assembly 110 may be considered in the locked position.

Figure 19B:
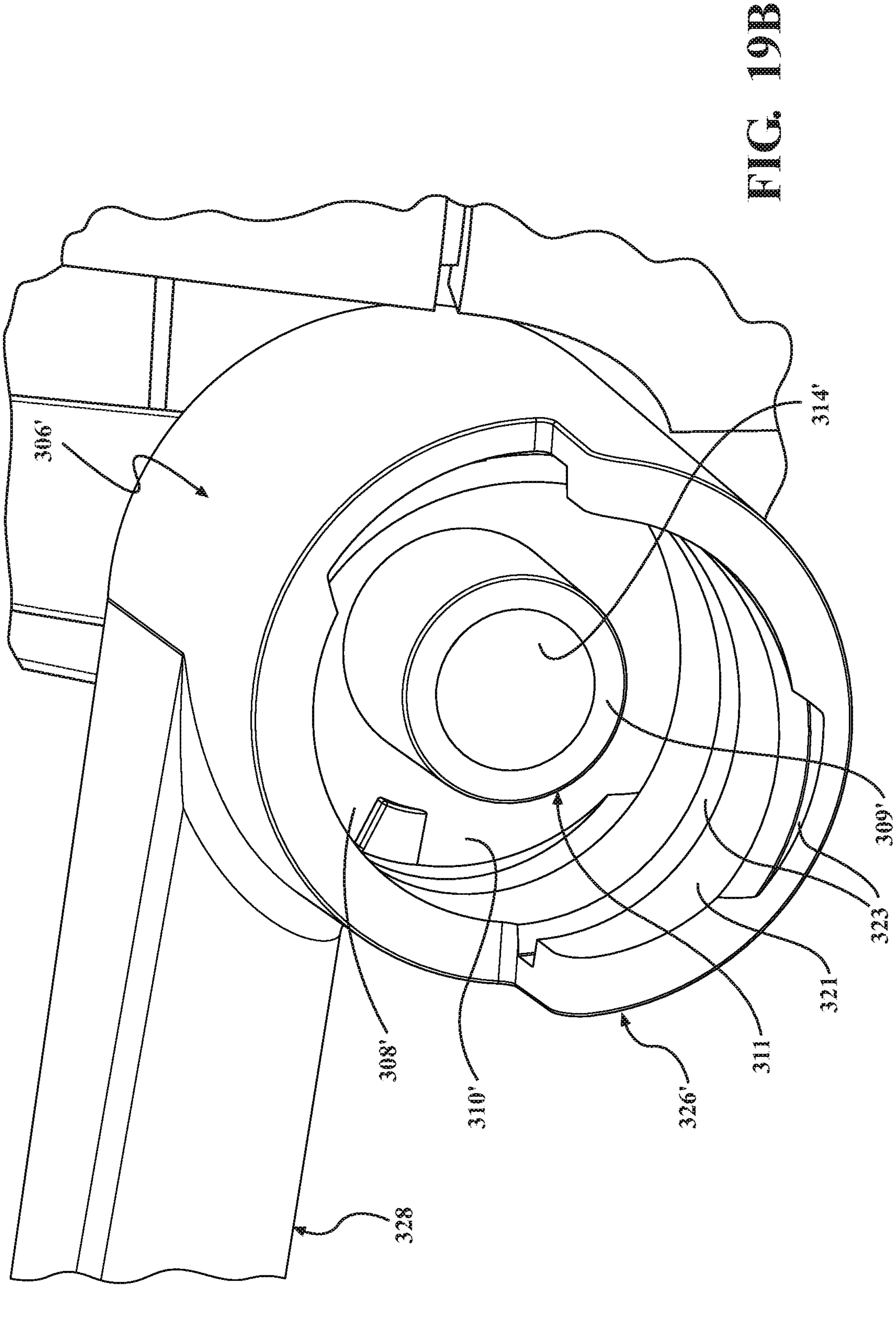
FIG. 19B is a detailed view of another implementation of the transfer conduit and release assembly.

Another implementation of the transfer conduit 306' is shown in FIG. 19B. The transfer conduit 306' includes a boss 311 extending from the interior wall 310'. The boss 311 may be coaxially disposed within the head portion 326'. The boss 311 includes the sidewall 314' defining a lumen in communication with the chamber 112 of the mixing device 102. The annular space between the boss 311 and the head portion 326' may be sized to accommodate the sealing element (not shown) that is coupled to the delivery device 104 in the present implementation. The head portion 326' may include the second coupling feature 318', in particular a rib 321 extending along an inner surface of the transfer conduit 306'. The rib 321 may be in a helical arrangement to define a groove 323 that is helical in shape. The groove 323 provides a female thread that is configured to threadably engage a male thread (not shown) disposed on the delivery device 104. More particularly, as the release assembly 110 is rotated from the unlocked position the locked position, for example, during assembly and packaging the system 100, the groove 323 rotates so as to draw the delivery device 104 towards the mixing device 102, thereby ensuring sealing engagement between the two. The sealing engagement further avoids inadvertent unlocking of the delivery device 104 from the mixing device 102. As the release assembly 110 is rotated from the locked position to the unlocked position, for example, prior to deployment of the delivery device 104, the groove 323 rotates so as to move the delivery device 104 away from the mixing device 102.

The body portion 328 may be an elongate structure extending from the head portion 326. FIG. 20 shows the body portion 328 including two legs 338 forming a generally right angle. One of the legs 338 includes a control surface 340 configured to receive the input from the user. One of the legs 338 may also include indicia 342, in this case the number "3," which may corresponding to the third step of the intuitive workflow. The third step of the workflow occurs after completion of the second step of the intuitive workflow, namely completion of the operational cycle of the mixing device 102, including the transferring phase in which the bone cement mixture is transferred to the delivery device 104. Once it is desired to decouple the delivery device 104 from the mixing device 102, the user provides an input to the control surface 340 to move the release assembly 110 from the locked position to the unlocked position. In particular, the release assembly 110 is rotated counterclockwise relative to the transfer conduit 306, during which the projections 334 encounter the defeatable features 324. Further input is provided with a suitable force to overcome the interference engagement of the defeatable feature 324, and the release assembly 110 is moved to the unlocked position shown in FIGS. 17, 19A and 19B.

Figure 20:
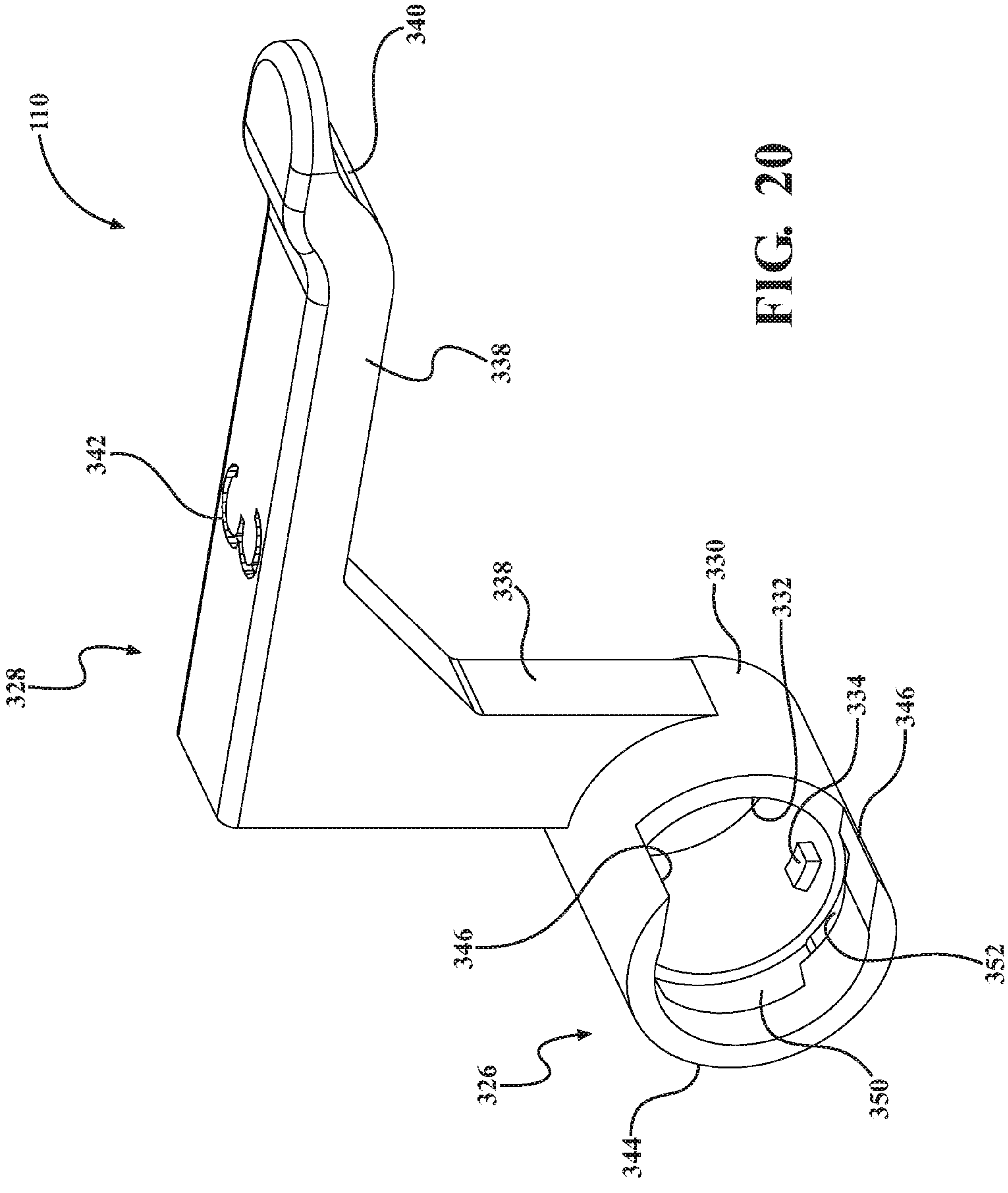
FIG. 20 is a perspective view of the release assembly of FIG. 19A.
Figure 21:
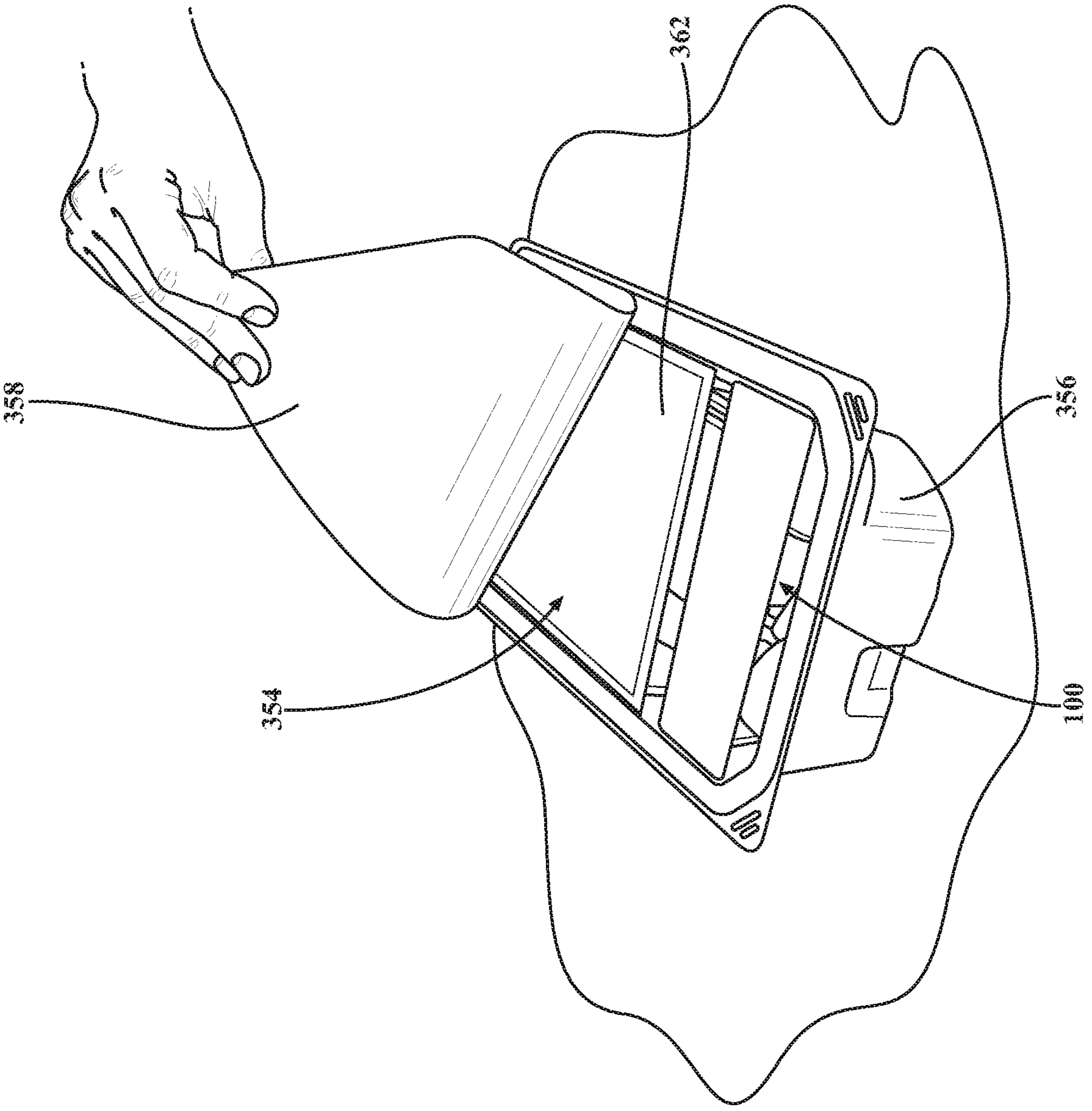
FIG. 21 is a pictorial representation of a step of a method of using a kit including the mixing and delivery system of FIG. 1.

FIG. 20, viewed in combination with FIG. 1, generally shows the release assembly 110 in the locked position. The head portion 326 of the release assembly 110 includes a lip 344 extending axially outwardly and subtending an arc such that a void is defined between two edges 346 of the lip 344. The void may be sized to be at least equal to a width of the complementary coupling feature of the delivery device 104 (e.g., a boss extending from the housing 118 and at least partially defining the inlet port 106). The lip 344 and the head portion 326 define a groove 348 at least substantially extending circumferentially between the edges 346 of the lip 344. The groove 348 include a first groove portion 350 and second groove portions 352 (one shown) disposed on each side on the first groove portion 350. The first groove portion 350 is wider than the second groove portions 352. The second groove portions 352 are sized and configured to retain the complementary coupling feature of the delivery device 104 (e.g., diametrically opposed tabs extending from the boss). The tabs on the delivery device 104 may be positioned at the six and twelve o'clock positions when the delivery device 104 is coupled with the release assembly 110 such that the delivery device 104 may not be decoupled axially or moved radially through the void.

With the release assembly 110 in the unlocked position, the first groove portion 350 is in registration with one of the tabs on the delivery device 104, and the void is in registration with another one of the tabs of the delivery device 104. The relatively greater width of the first groove portion 350 permits some axial movement of the delivery device 104 relative to the release assembly 110 with the first groove portion 350 positioned at the six o'clock position (see FIG. 19A). In combination, the void is positioned at the twelve o'clock position and permits an upward manipulation of the delivery device 104 relative to the release assembly 110 to decouple the delivery device 104 from the release assembly 110 and the mixing device 102. Another input may be provided to the control surface 115 of the cradle 114 to permit removal of the housing 118 of the delivery device 104 from the cradle 114.

The mixing and delivery system 100 provides several advantages in the surgical suite. First, the mixing device 102 and the delivery device 104 may be efficiently packaged. Referring now to FIGS. 19 and 20, a kit is shown including the mixing device 102 and the delivery device 104. The kit may further include packaging, for example, a blister pack 354 having a base 356 and a cover 358. The base 356 may be a thermoformed plastic generally contoured to the mixing and delivery system 100, and the cover 358 may be a peel away film coupled to the base 356 with adhesive. The space-conscious manner in which the mixing device 102 and the delivery device 104 are disposed within the base 356 of the blister pack 354 may accommodate including the bone cement components (i.e. the liquid monomer 360 (see FIG. 25) and the powdered polymer 362) conveniently within the blister pack 354. The entire contents of the blister pack 354 may be in a sterile state before the blister pack is opened. As such, the surgical technician need only present the blister pack 354 across the sterile barrier of the surgical suite without needing to separately retrieve, for example, each of the mixing device 102, the delivery device 104, the liquid monomer 360 and the powered polymer 362. Alternatively, the blister pack 354 may include a packaging insert, for example a thermoformed tray, to protect the cover 358 from damage due to contact with the mixing and delivery system 100. This packaging insert may include features to hold the liquid monomer 360 and powdered polymer 362, allowing them to be transferred to the sterile field in one step. Furthermore, the mixing and delivery device 100, liquid monomer 360, and powdered polymer 362 may be packaged in an inner blister tray, covered with a tray insert, all of which can be transferred to the sterile field in one step. Fewer items being presented across the sterile barrier improves efficiency and lessens likelihood of contamination of the sterile field. In another example, the liquid monomer 360 and powdered polymer 362 may be coupled directly to the mixing device such that they can be removed from the packaging with the rest of the mixing and delivery device 100 as a single unit. In another example, the powdered polymer 362 may be packaged in the chamber 112. This arrangement would eliminate the steps of transferring the powdered polymer 362 to the sterile field and introducing the powder through the funneling device 138. In addition, the liquid monomer 360 may be packaged in a way that allows it to interface with the chamber 112 directly (e.g. a syringe, foil pouch, or dispensing device), thus eliminating the need for a funneling device.

Second, as previously mentioned, the side-by-side arrangement of the mixing device 102 and the delivery device 104 permits the mixing device 102 and the delivery device 104 to be compactly packaged in the coupled configuration before deployment in the surgical suite. Referring again to FIG. 1, the mixing device 102 includes the longitudinal axis $LA_M$ of the chamber 112 previously described with reference to FIGS. 4 and 5. Further, the delivery device 104 includes a longitudinal axis $LA_D$. The longitudinal axis $LA_D$ of the delivery device 104 may generally be defined between ends of the housing 118 of the delivery device 104 and/or coaxial with the chamber of the delivery device 104. As generally appreciated from FIG. 1, with the delivery device 104 coupled to the mixing device 102, the respective longitudinal axes $LA_D$, $LA_M$ are parallel. The parallel arrangement of the respective longitudinal axes $LA_D$, $LA_M$ provide for the efficient packaging previously mentioned. To facilitate the parallel arrangement, the outlet port 108 defined by the transfer conduit 306 (and the inlet port 106 of the delivery device 104) is arranged perpendicular to each of the respective longitudinal axes $LA_D$, $LA_M$. In other words, the bone cement mixture being moved within the chamber 112 initially along the longitudinal axis $LA_M$ is generally directed sideways to be directed through the outlet port 108 and into the inlet port 106 of the delivery device 104. Thereafter, the bone cement mixture may be generally directed sideways to be moved within the chamber of the delivery device 104 along the longitudinal axis $LA_D$. Moreover, with the delivery device 104 coupled to the mixing device 102, the respective longitudinal axes $LA_D$, $LA_M$ are coplanar on a plane that is substantially horizontal to effectuate the side-by-side arrangement previously mentioned. The parallel and side-by-side arrangement permits the lengths of the respective housings 116, 118 to be generally equal in the coupled configuration (when viewed in plan). In other words, there are few, if any, structures of the mixing device 102 and the delivery device 104 extend beyond one another, thereby minimizing requiring unnecessary accommodations in the corresponding packaging.

Figure 22:
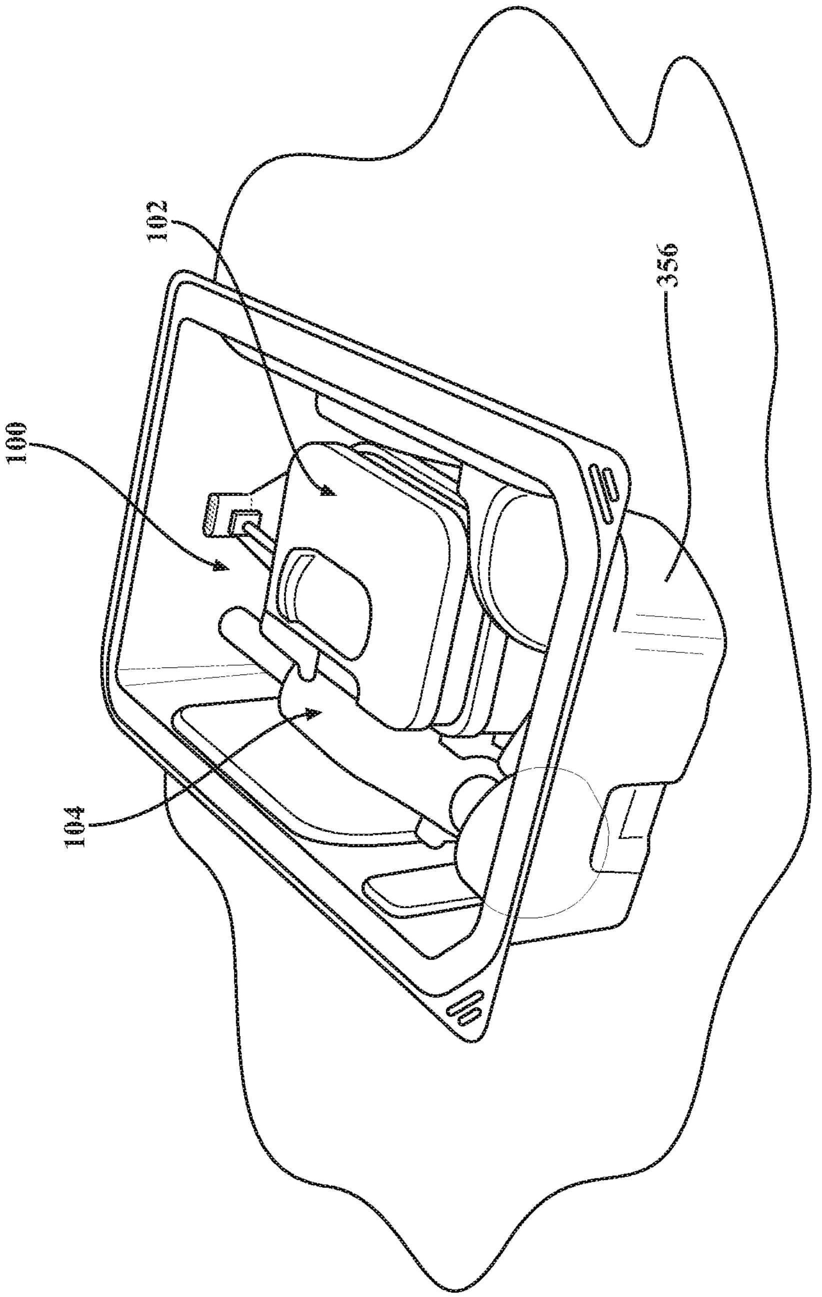
FIG. 22 is a pictorial representation of another step of the method.
Figure 23:
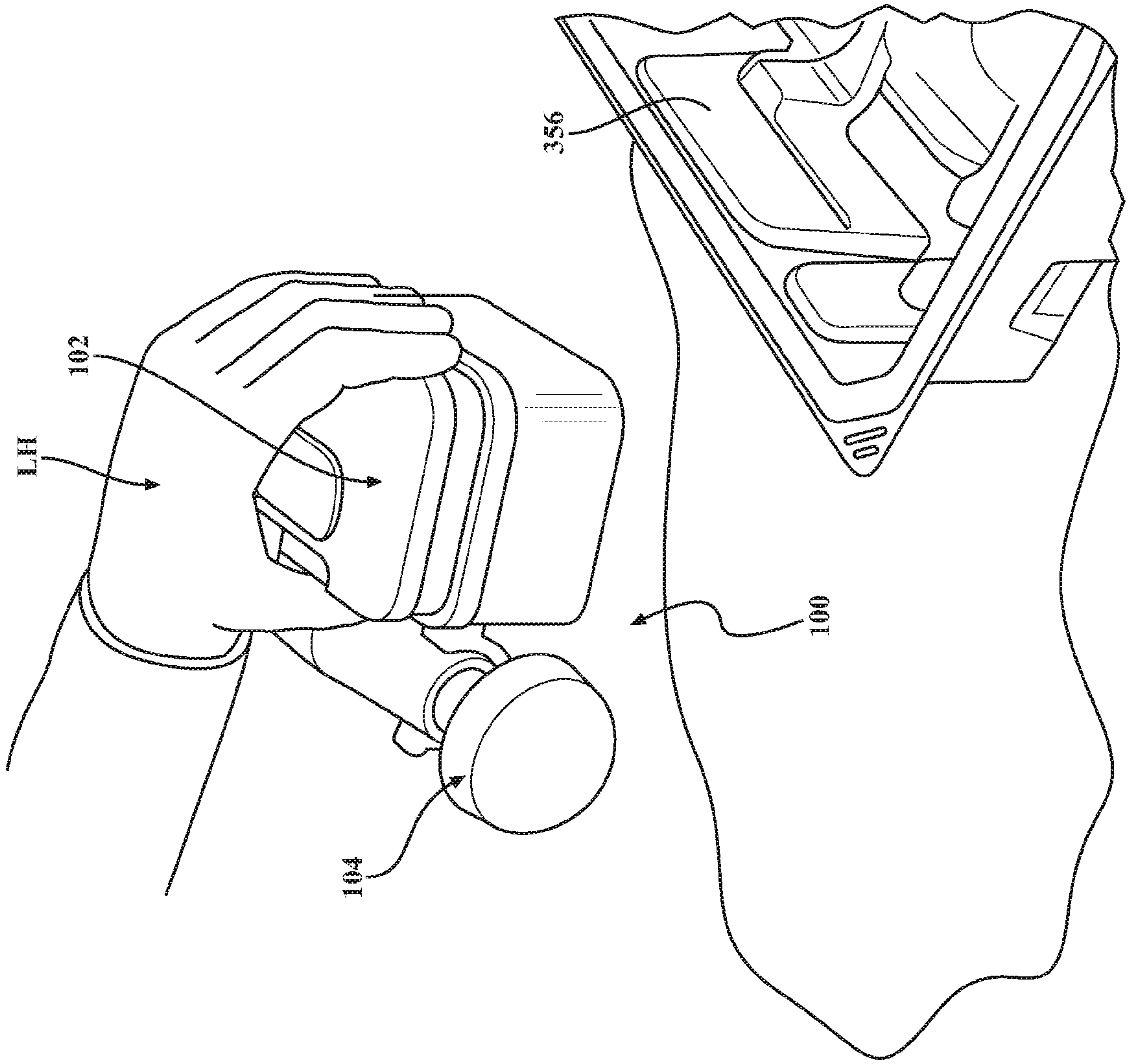
FIG. 23 is a pictorial representation of another step of the method.
Figure 24:
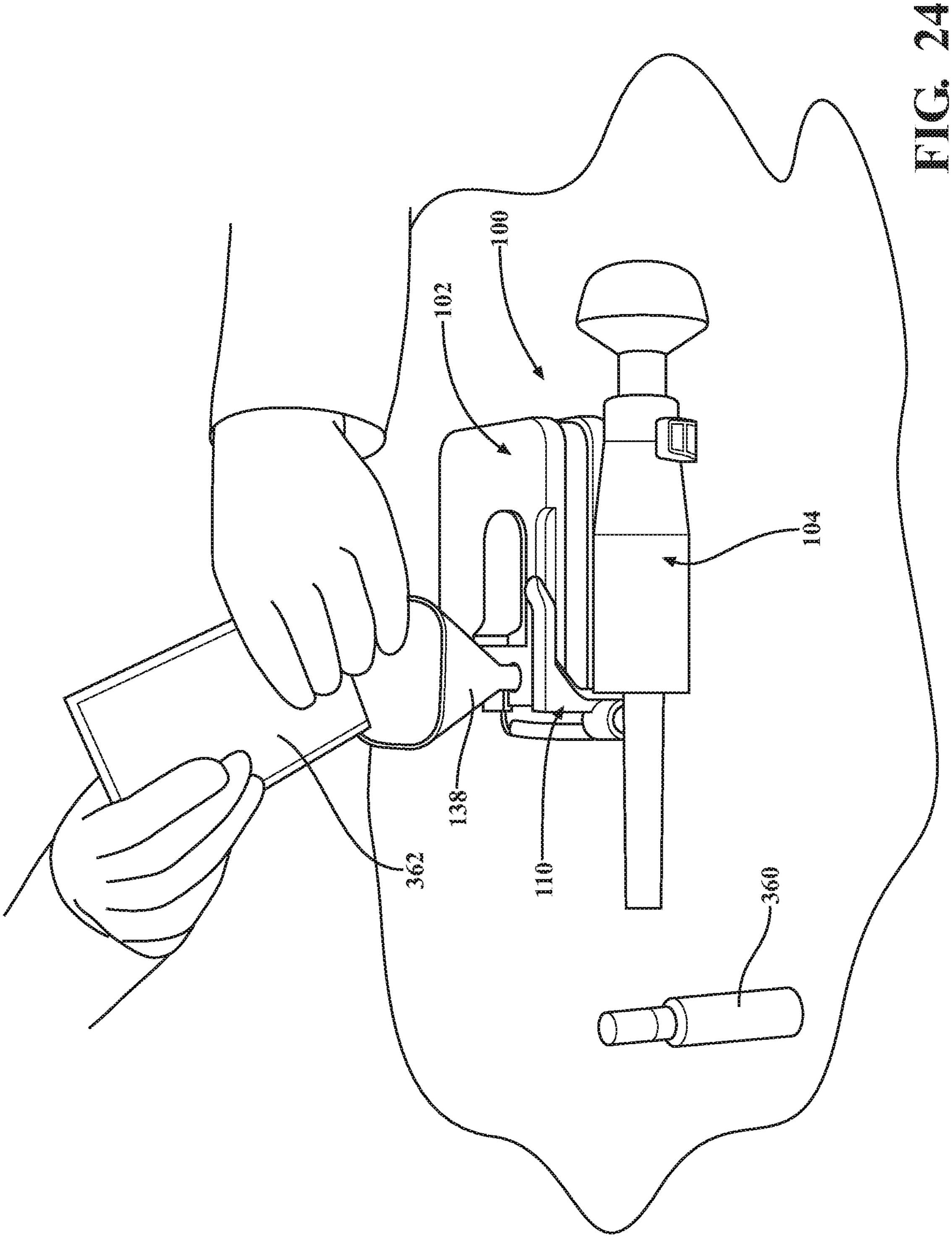
FIG. 24 is a pictorial representation of another step of the method.

FIG. 22 shows the mixing and delivery system 100 within the base 356 of the blister pack 354, and FIG. 23 shows the mixing and delivery system 100 being removed from the base 356 as a unit with one hand, the left hand (LH) of the user. Further, the flexible tether 142 allows the funneling device 138 to be moved with the one hand together with the mixing device 102 and the delivery device 104. Furthermore, packaging the mixing and delivery system 100 in the coupled configuration before deployment in the surgical suite permits the user to immediately use of the system 100 without needing to couple the delivery device 104 to the mixing device 102, either prior to or after commencement of the surgical procedure. Risk of user error is minimized, and the user can be confident a closed, sealed system is provided between the delivery device 104 and the mixing device 102.

Figure 25:
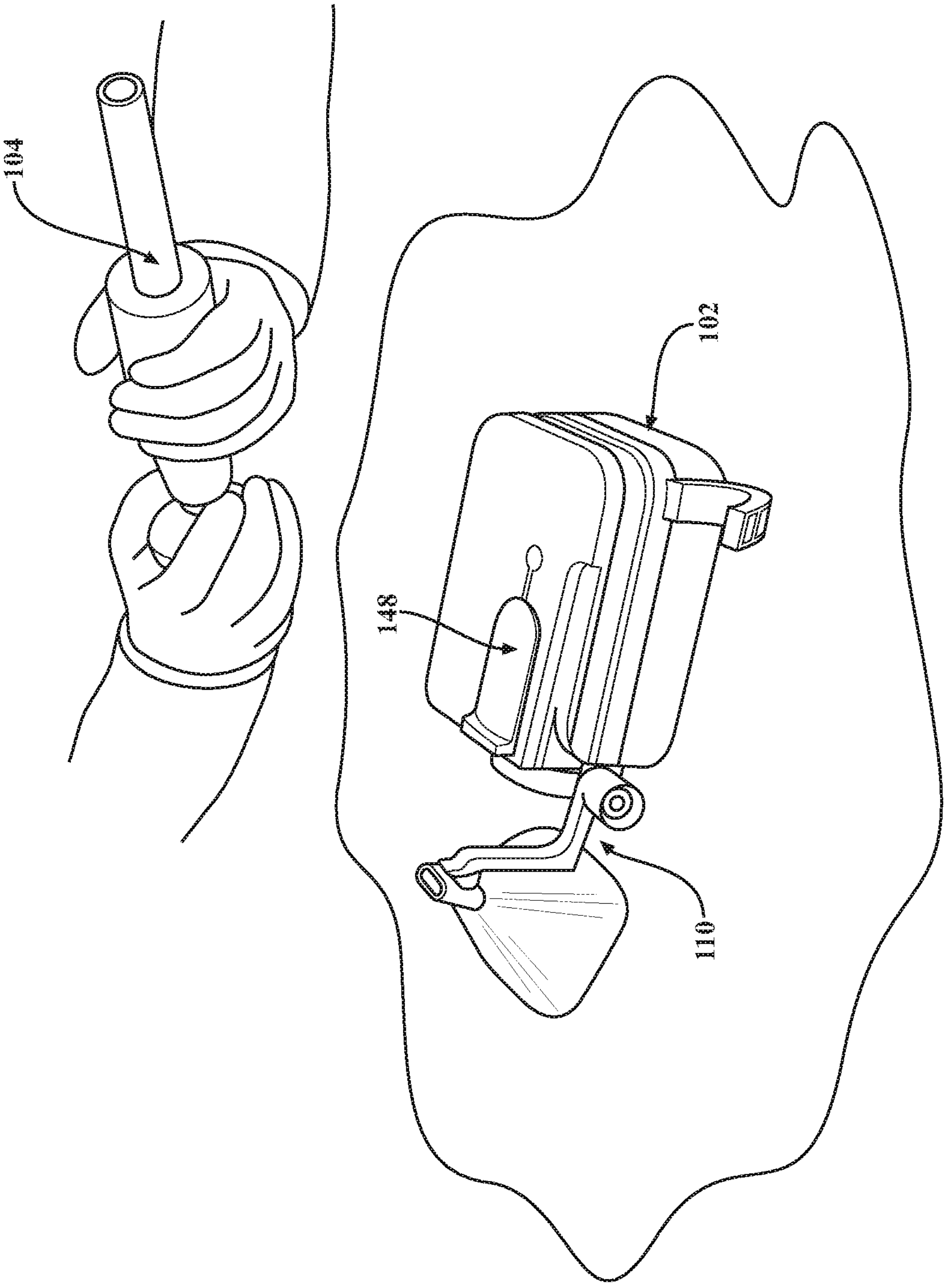
FIG. 25 is a pictorial representation of another step of the method.

With the mixing and delivery system 100 in the sterile field of the surgical suite, the user may begin the three-step intuitive workflow, as generally shown in FIGS. 22 and 23. As indicated by the indicia 144 on the funneling device 138 being the number "1," the first step includes the user inverting the funneling device 138 to be positioned within the aperture 135. The number "1" indicia may also be included on the housing 116, preferably near the aperture 135, to help inform the user where to insert the funneling device 138. The user introduces the liquid monomer 360 and the powered polymer 362 to the funneling device 138 to be directed to the chamber 112 within the mixing device 102. As indicated by the indicia 152 on the actuator 148 being the number "2," the second step includes the user providing an input to the actuator 148, for example moving the slider 150 from the first position to the second position. In manners previously explained in detail, that through the actuation of the actuator 148, the mixing device 102 automatically performs the operational cycle in a manner that mixes the bone cement components at atmospheric pressure and compresses and transfers the bone cement mixture in a self-sealing manner. Moreover, the mixing device 102 automatically deactivates to terminate the operational cycle after a predetermined period that is based on the end of the mixing, compression and transferring phases. Deactivation of the mixing device 102 indicates completion of step two of the intuitive workflow. The user may discern deactivation of the mixing device 102 from the elapsed time (e.g., less, equal to, or greater than one minute) and/or the absence of noise that may be associated with the motor 178, the geartrain 184, and the like. As indicated by the indicia 342 on the release assembly 110 being the number "3," the third step of the intuitive workflow includes providing an input to the release assembly 110 to move the release assembly 110 from the locked position to the unlocked position, thereby permitting decoupling of the delivery device 104 from the mixing device 102. The delivery device 104 is readied for use as shown in FIG. 25.

While bone cement compositions have been described as including the liquid monomer component and the powdered polymer component, other exemplary bone cement components may be mixed in accordance with the methods and systems described above, including those that include more than two components, those that include two liquid components, or those that include one or more paste components. In addition, the systems and methods described above may be used to deliver compositions other than bone cement, such as bone graft material, biological agents, other hardenable substances, and combinations thereof.

Figure 26:
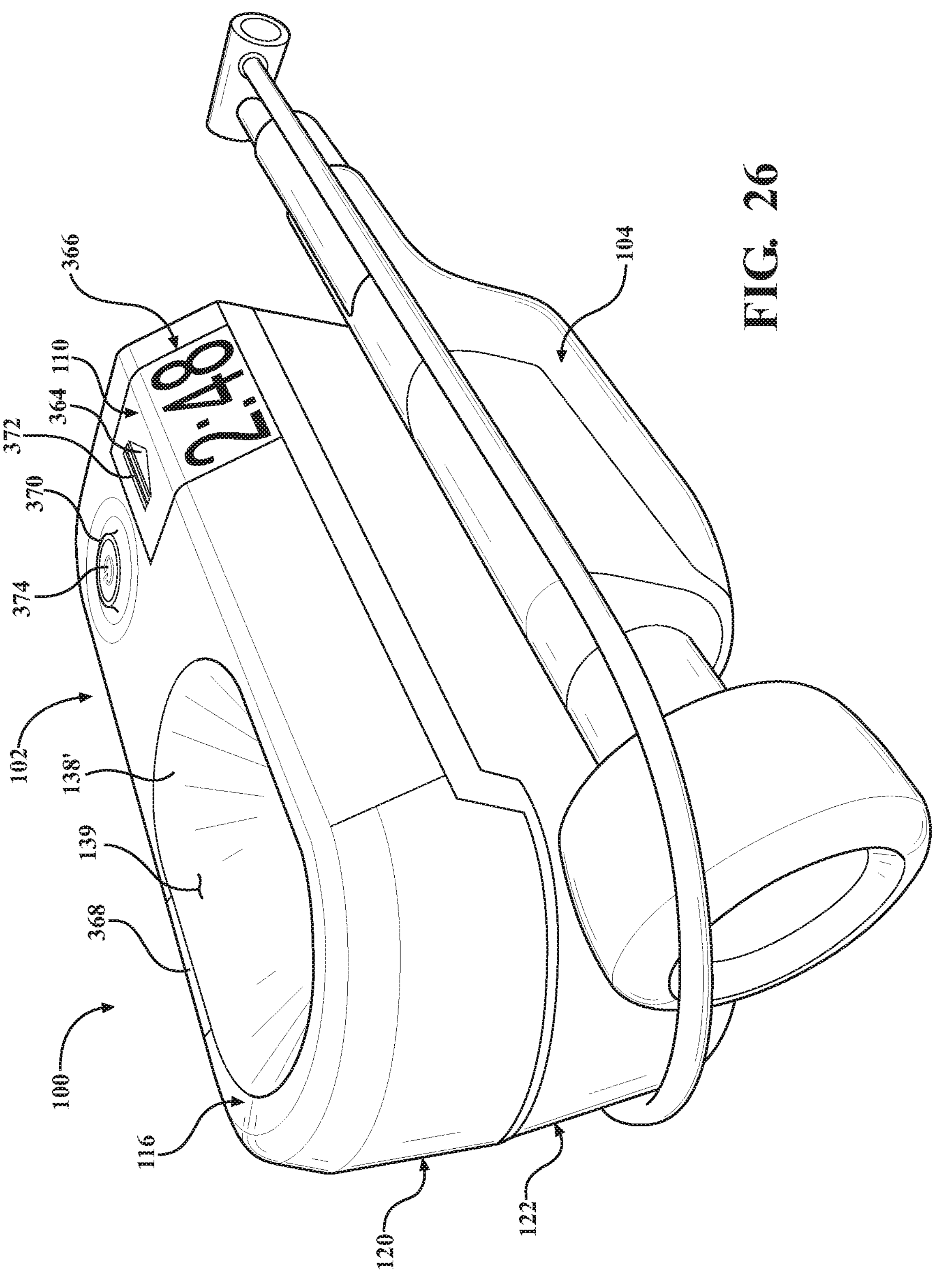
FIG. 26 is a front perspective view of a mixing and delivery system including a mixing device and a delivery device.

It is further contemplated that many modifications and variations are possible in light of the above teachings and the invention may be practiced otherwise than as specifically described. By way of examples and with reference to FIG. 26, the mixing and delivery system 100 is shown including stylized implementations of the mixing device 102 and the delivery device 104. The delivery device 104 may be the same or similar as that shown in FIG. 1, disclosed in the aforementioned, International Publication No. WO2019/200091, or disclosed in the aforementioned U.S. Pat. No. 6,547,432, among others. Alternatively, the delivery device 104 may comprise a hydraulic mechanism, where mixing device 102 transfers bone cement into a cartridge capable of being pressurized by a hydraulic pump.

The mixing device 102 may include an internal structure and operation at least similar in many respects to the implementation previously discussed with only certain variations to be described in the interest of brevity. With continued reference to FIG. 26, the funneling device 138 may be integrated into the housing 116. In particular, the upper shell 120 of the housing 116 defines the funnel 138' being a sloped surface 139 extending downwardly from an upper surface. The funnel 138' is in communication with the aperture (not shown) leading to the chamber (not shown). The integration of the funnel 138' further reduces the footprint of the mixing device 102 and consequently the mixing and delivery system 100. The reduced footprint may simplify packaging and consume less space in the operating suite. Moreover, the integration of the funnel 138' may simplify the workflow for the user by removing the need for the user to insert the funneling device 138 of FIG. 1 into the aperture 135.

The release assembly 110 of the mixing device 102 may be a button 364 as opposed to the lever previously described. FIG. 27 shows the button 364 disposed on the upper surface of the upper shell 122 of the housing 116 with "eject" indicia known to many. The button 364 may be actuated, and an internal mechanism (not shown) of the release assembly coupled to the button 364 may move the system 100 from the initial or locked position to the unlocked position to permit decoupling of the delivery device 104 from the mixing device 102. As the release assembly 110 moves the system 100 from the initial or locked position to the unlocked position, the internal mechanism may be further configured to slightly move a portion of the delivery device 104 away from the mixing device 102 so as to provide a visual indication that the delivery device 104 is no longer docked and it is appropriate to fully remove the delivery device 104 for use.

In one implementation, the release or "undocking" of the delivery device 104 from the mixing device 102 may be based on movement of one or more components of the mixing device 102. For example, mechanical, electromechanical, or electrical actuator(s) may detect when the piston 156 is located in a position within the second region 160 of the chamber 112 indicative of completion of the compression and transferring phases. Based on the position, the actuator(s) move the system 100 from the locked position to the unlocked position, and/or slightly move a portion of the delivery device 104 away from the mixing device 102.

The mixing device 102 may include a display 366, for example, a digital numeric display. The display 366 is shown as being disposed on a front surface of the upper shell 120, but other suitable locations are contemplated. The display 366 is configured to provide information to the user regarding the operation of the system 100, and more particularly the mixing device 102. In one example, the display 366 displays a time remaining for the operational cycle. In other words, the display 366 counts down to zero from an initial time. In another example, the display 366 displays a time elapsed for the operational cycle. In other words, the display 366 counts up from zero. In still another example, the display 366 displays an estimation of remaining working time for the bone cement. A temperature sensor (not shown) may be included on the mixing device 102. Owing to that total working time for bone cement is dependent on external temperature, an algorithm may be stored on memory (not shown) to determine total working time for the bone cement based on the temperature (e.g., room temperature) sensed by the temperature sensor. In combination with the timer function, a processor may determine the remaining working time as the difference between the total working time and the elapsed working time. In addition to the display 366 displaying the remaining working time as a numerical value, other types of visual indicia may be provided. The display 366 may change color (e.g., green, yellow, red) as the remaining working time falls below predetermined thresholds. Likewise, the display 366 may blink, and/or audible alarms may also be provided. Still further, the timer may be series of lights, a moving bar, an analog clock, or the like.

In certain implementations, the display 366 may be configured to selectively or automatically move between information regarding the operation of the mixing device 102, or the bone cement. For example, the display 366 may provide a first output including time remaining for the operational cycle, as mentioned above. Then, after reaching zero, the display 366 may automatically move from the first output to a second output including counting up from zero to indicate the amount of elapsed working time. The user may selectively toggle between the first input, the second input, and/or any additional inputs.

The mixing device 102 may include at least one light 368, 370, 372 to enhance usability. In at least some respects, the lights 368, 370, 372 may be similar to the indicia 146, 152, 342 (see FIGS. 2 and 20) to guide the user through the workflow. A first light 368 may be positioned near, on, about, or around the funneling device 138, thus corresponding to the step of directing the bone cement components into the chamber 112 through the funneling device 138. A second light 370 may be positioned near, on, about, or around a power button 374, thus corresponding to the step of operating the mixing device 102 to initiate the operational cycle. A third light 372 may be positioned near, on, about, or around the button 364, thus corresponding to the step of moving the release assembly 110 from the locked configuration to the unlocked configuration. The lights 368, 370, 372 may be light emitting diodes (LEDs) or other suitable light source.

The lights 368, 370, 372 may be in communication with the controller or processor. Based on certain actions, the controller may selectively control one or more of the lights 368, 370, 372 to illuminate to alert the user what to do next. In one workflow, the power button 374 may be actuated to turn on the mixing device 102; i.e., awake the mixing device 102 from a sleep-like state. The controller sends a signal to illuminate the first light 368, as directing the bone cement components into the chamber 112 through the funneling device 138 may be the first step of the workflow. The first light 368 may remain illuminated until a sensor in communication with the controller (e.g., a load sensor within the chamber 112, and optical sensor near the aperture 135) detect that the bone cement components have been directed into the chamber 112. The controller, based on a signal received from the sensor, sends a corresponding signal to cease illumination of the first light 368 and illuminate the second light 370, as pressing the power button 374 may be the second step of the workflow. The mixing device 102 beings the mixing, compression, and transferring phases of the operational cycle previously described. The display 366 may provide information regarding the status of the operational cycle. Once complete, the controller, sends a corresponding signal to cease illumination of the second light 370 and illuminate the third light 372, as moving the release assembly 110 from the locked configuration to the unlocked configuration may be the third step of the workflow. The user may press the button 364, and remove the delivery device 104 from the mixing device 102. Once the button 364 is pressed, the display 366 may begin displaying the remaining working time as the difference between the total working time and the elapsed working time, for example, based on room temperature.

Certain implementations may be described with reference to the following exemplary clauses:

Clause 1—A method of making bone cement with a mixing device including a chamber defining an inlet opening, the chamber including a first end opposite a second end with the inlet opening between the first and second ends, the mixing device further including a piston disposed within the chamber, and a mixing paddle disposed within the chamber, the method comprising the steps of: with a face of the piston located within a first region of the chamber extending longitudinally between the first end of the chamber and the inlet opening, mixing with the mixing paddle the bone cement components at a first pressure to make a bone cement mixture; and moving the piston towards the second end of the chamber so that the face of the piston passes the inlet opening to be located within a second region of the chamber to compress the bone cement mixture at a second pressure greater than the first pressure.

Clause 2—The method of clause 1, wherein the first pressure is atmospheric pressure.

Clause 3—The method of clauses 1 or 2, further comprising the step of forming a fluid-tight closure between the piston and the chamber in the second region.

Clause 4—The method of any one of clauses 1-3, wherein the chamber further defines an outlet port adjacent the second end of the chamber, wherein the step of moving the piston further comprises moving the piston along the longitudinal axis within the second region to urge the bone cement out of the mixing device through the outlet port.

Clause 5—The method of any one of clauses 1-4, further comprising rotating the mixing paddle to mix of the bone cement components within the chamber.

Clause 6—The method of any one of clauses 1-5, further comprising the step of collapsing the mixing paddle with forces associated with each of the piston moving along the longitudinal axis and an interior face of the housing defining the second end of the chamber.

Clause 7—A method of making bone cement with a mixing device and transferring the bone cement to a delivery device coupled to the mixing device, the mixing device including a chamber defining an inlet opening, a piston disposed within the chamber, a mixing paddle disposed within the chamber, a motor coupled to the piston and the mixing paddle, an actuator coupled to the housing, and a door coupled to the actuator, the method comprising the steps of: introducing at least two bone cement components into the chamber through the inlet opening; and moving the actuator from the first position to a second position to cover the inlet opening with the door and simultaneously activate the motor while the piston is located within a first region, wherein activation of the motor rotates the mixing paddle to mix the at least two bone cement components in the chamber at atmospheric pressure to make a bone cement mixture, and moves the piston pass the inlet opening to within a second region of the chamber to (i) compress the bone cement mixture at a second pressure greater than atmospheric pressure, and (ii) transfer the bone cement to the delivery device.

Clause 8—The method as set forth clause 7, wherein the mixing device further includes a release assembly coupling the mixing device to the delivery device, the method further comprising the step of providing an input to move the release assembly from a locked position in which orientation features of the release assembly are engaging complementary orientation features of the delivery device, to an unlocked position in which the orientation features and complementary orientation features are disengage to permit decoupling of the delivery device from the mixing device.

Clause 9—The method of clauses 7 or 8, wherein the at least two bone cement components are a liquid monomer and a powdered polymer, wherein the step of introducing the bone cement components into the chamber further comprises directing both the liquid monomer and the powdered polymer through the inlet opening.

Clause 10—A mixing device for making bone cement, the mixing device comprising: a housing; a chamber within the housing, the chamber having a first region, and a second region separate from the first region; a mixing paddle rotatable within the chamber to mix bone cement components to make a bone cement mixture; a piston movable within the chamber to compress the bone cement components; a motor coupled to the piston and the mixing paddle; a switch connected to the motor with the switch configured to move between an activated state in which the switch initiates an operational cycle by activating the motor to effectuate at least one of movement of the piston and rotation of the mixing paddle, and a deactivated state in which the switch terminates the operational cycle by deactivating the motor, wherein the switch is biased toward the deactivated state; and an actuator coupled to the housing and movable between a first position in which the actuator is spaced apart from the switch, and a second position in which the actuator engages the switch to move the switch from the deactivated state to the activated state and maintains the switch in the activated state against the bias, wherein, the piston is configured to move within the chamber from the first region to the second region such that, when the piston is within the second region, the actuator is mechanically disengaged from the switch to permit the biased return of the switch from the activated state to the deactivated state.

Clause 11—The mixing device of clause 10, wherein the switch is a momentary switch.

Clause 12—The mixing device of clauses 10 or 11, further comprising: a transfer gear coupled to the motor and rotatable during the operational cycle; and a stop nut coupled to the transfer gear rotationally constrained relative to the transfer gear such that the stop nut is configured to translate along the transfer gear and engage the actuator to effectuate the mechanical disengagement of the actuator from the switch.

Clause 13—The mixing device of clause 12, wherein the stop nut further comprises a nut portion having an inner diameter threadably engaging an outer diameter of the transfer gear, and a flange portion extending from the nut portion with the flange portion configured to engage the actuator to effectuate the mechanical disengagement of the actuator from the switch.

Clause 14—The mixing device of any one of clause 10-13, wherein the actuator is a slider comprising a slider body, an arm extending from an underside of the slider body, and a stop feature coupled to the arm and configured to engage the switch.

Clause 15—The mixing device of clause 14, wherein the slider further comprises a ramping surface coupled to the arm and arranged to be engaged by the stop nut as the stop nut translates with rotation of the transfer gear, wherein the engagement of the stop nut with the ramping surface imparts flexion to the arm and disengage the stop feature from the switch.

Clause 16—A mixing device for making bone cement, the mixing device comprising: a housing; a chamber within the housing, the chamber having a first region, and a second region separate from the first region; a mixing paddle rotatable within the chamber to mix bone cement components to make a bone cement mixture; a piston movable within the chamber to compress the bone cement components; a motor coupled to the piston and the mixing paddle; a switch connected to the motor with the switch configured to move between an activated state in which the switch initiates an operational cycle by activating the motor to effectuate at least one of movement of the piston and rotation of the mixing paddle, and a deactivated state in which the switch terminates the operational cycle by deactivating the motor, wherein the switch is momentary and biased toward the deactivated state; and an actuator coupled to the housing and movable between a first position in which the actuator is spaced apart from the switch, and a second position in which the actuator engages the switch to move the switch from the deactivated state to the activated state and maintains the switch in the activated state against the bias.

The foregoing disclosure is not intended to be exhaustive or limit the invention to any particular form. The terminology which has been used is intended to be in the nature of words of description rather than of limitation.

What is claimed is:

1. A mixing device for making bone cement, said mixing device comprising:
- a housing;
- a chamber within said housing;
- a mixing paddle rotatable within said chamber to mix bone cement components to make a bone cement mixture;
- a piston movable within said chamber to compress the bone cement components;
- a motor coupled to said piston and said mixing paddle; and
- a switch connected to said motor with said switch being momentary and biased to a deactivated state in which said switch prevents activation of said motor; and
- an actuator comprising a slider coupled to said housing and slidably movable between a first position in which an arm of said actuator is spaced apart from said switch, and a second position in which said arm of said actuator engages said switch to move said switch from said deactivated state to an activated in which said switch initiates an operational cycle by activating said motor to effectuate at least one of movement of said piston and rotation of said mixing paddle,
- wherein said piston is configured to be moved within said chamber from a first region of the chamber in which the bone cement components are mixed to a second region of the chamber in which the bone cement mixture is compressed, and wherein said piston is within said first region during actuation of said switch.

2. The mixing device of claim 1, wherein said switch is a first switch, said mixing device comprising second switch wired in series with said first switch and said motor, said second switch being non-momentary and initially disposed an activated state to permit activation of said motor, wherein said second switch is configured to be moved from said activated state to a deactivated state in which said motor is deactivated to terminate said operational cycle, and with said piston in said second region during actuation of said second switch.

3. The mixing device of claim 1, wherein said chamber is at or below atmospheric pressure with said piston in said first region, and wherein said chamber is above atmospheric pressure with said piston in said second region.

4. A mixing device for making bone cement, said mixing device comprising:
- a housing;
- a chamber within said housing, said chamber defining an inlet opening configured to receive bone cement components;
- a mixing paddle rotatable within said chamber to mix the bone cement components to make a bone cement mixture;

a piston movable within said chamber to compress the bone cement components;

a motor coupled to said piston and said mixing paddle;

a switch mounted to said housing connected to said motor, said switch initially in a deactivated state; and an actuator comprising a slider coupled to said housing and movable between a first position in which said slider is spaced apart from said switch and said inlet opening is open to the ambient, and a second position in which said slider both (i) closes said inlet opening and (ii) engages said switch to move said switch from said deactivated state to an activated state in which said switch is configured to initiate an operational cycle by activating said motor to effectuate at least one of movement of said piston and rotation of said mixing paddle.

5. The mixing device of claim 4, wherein said switch is a first switch, said mixing device further comprising:

a second switch mounted to said housing and spaced from said first switch, said second switch initially in an activated state, wherein said first and second switches are wired in series with said motor; and a stop nut movable to be engaged with said second switch to move said second switch from said activated state to said deactivated state.

6. The mixing device of claim 5, wherein said actuator is a slider comprising a slider body, an arm extending from an underside of said slider body, wherein said arm is configured to be moved into engagement with said first switch.

7. The mixing device of claim 5, wherein said first and second switches are directly mounted to said housing at separate locations without being coupled to a printed circuit board.

8. The mixing device of claim 4, further comprising:

a funneling device comprising a widened portion, and a stem sized to be received within said inlet opening of said chamber; and a flexible tether coupling said funneling device with said housing.

9. The mixing device of claim 4, wherein said housing defines an aperture, wherein said inlet opening is positioned beneath said aperture such that the bone cement components being directed through said aperture further pass through said inlet opening and into said chamber under the influence of gravity, and wherein said actuator further comprises a door arranged to be positioned between said inlet opening and said aperture when said actuator is in said second position.

10. The mixing device of claim 8, wherein said funneling device further comprises a locking feature disposed on said stem and configured to releasably engage a complementary locking feature of said housing.

* * * * *